United States Patent

Lin et al.

[11] Patent Number: 5,881,064
[45] Date of Patent: Mar. 9, 1999

[54] PACKET-SWITCHED DATA NETWORK AND METHOD OF OPERATION

[75] Inventors: Feng Lin, Singapore, Singapore; Samuel Anthony Kassatly, Palo Alto, Calif.

[73] Assignee: Samuel A. Kassatly, San Jose, Calif.

[21] Appl. No.: 687,233

[22] Filed: Jul. 25, 1996

Related U.S. Application Data

[63] Continuation-in-part of Ser. No. 210,889, Mar. 18, 1994, Pat. No. 5,546,388.

[51] Int. Cl.$^6$ .................................................. H04L 12/56
[52] U.S. Cl. ........................................... 370/395; 358/431
[58] Field of Search ..................................... 370/389, 395, 370/470, 471, 474–476; 375/241, 242, 245, 246, 253, 261, 271, 268; 348/467, 468, 471, 472, 473, 474; 358/400, 409, 425, 435, 431, 436, 437, 438, 434, 428

[56] References Cited

U.S. PATENT DOCUMENTS 5,570,028  10/1996  Spezlazzo et al. ..................... 24/528

OTHER PUBLICATIONS

Brian H. Marcus, et al., "Finite–State Modulation Codes for Data Storage," IEEE Trans. Selected Areas of Commun., vol. 10, No. 1, Jan. 1992, pp. 5–37.

C. Menyennett, et al., "Sequences and a New Code with Spectral Nulls at Rational Submultiples of the Symbol Frequency," IEEE Trans. Mag., vol. 29, No. 6, Nov. 1993, pp. 4042–4044.

K.A. S. Immink, Coding Techniques for Digital Recorders, Englewood Cliffs, NJ: Prentice–Hall, 1991, pp. 247–263.

M. K. Haynes, "Magnetic Recording Techniques for Buried servos," IEEE Trans. Mag., vol. MAG–17, No. 6, Nov. 1981, pp. 2730–2734.

N.H. Hansen, "A Head Positioning System Using Buried Servos," IEEE Trans. Mag., vol. MAG–187, No. 6, Nov. 1981, pp. 2735–2738.

R.K. Oswald, "Track Following Servo System," IBM Technical Disclosure Bulletin, vol. 18, No. 10, Mar. 1976, pp. 3424–3425.

W.A. Herrington, et al., "Quad–Burst PES System for Disk File Servo," IBM Technical Disclosure Bulletin, vol. 21, No. 2, Jul. 1978, p. 804.

D.H. Pennington, et al., "Digital Sector Servo System," IBM Technical Disclosure Bulletin, vol. 22, No. 6, Nov. 1979.

C.C. Liu, Quad–Burst Servo Pattern, Quad–Burst Servo Pattern, IBM Technical Disclosure Bulletin, vol. 22, No. 12, May 1980, pp. 5436–5438.

*Primary Examiner*—Dang Ton
*Attorney, Agent, or Firm*—Samuel A. Kassatly

[57] ABSTRACT

A node system for use in a data communication network including a plurality of source and destination data communication devices. The node system receives data packets from another node system, and forms image data from the received data packets. The node system selectively inserts fill codes into the image data so that such selective insertion of the fill codes prevents service interruption between the plurality of source data communication devices and the plurality of destination data communication devices by correcting a temporary inability to receive additional data, and by maintaining real time communication between the plurality of source data communication devices and destination data communication devices. The node system is capable of sending the image data and the fill codes to the plurality of destination data communication devices.

17 Claims, 21 Drawing Sheets

PACKET-SWITCHED DATA NETWORK AND METHOD OF OPERATION

CROSS REFERENCE TO RELATED APPLICATIONS

This application is a continuation-in-part application of patent application Ser. No. 08/210,889, filed on Mar. 18, 1994 now U.S. Pat. No. 5,546,388, which is incorporated herein by reference.

This application is related to PCT patent application No. PCT/SG 95/00003, filed on Mar. 6, 1995.

BACKGROUND OF THE INVENTION

1. Field of the Invention

The present invention relates in general to the field of data communications, and it more specifically relates to a packet-switched data network and method of operation.

2. Background Art

Digital facsimile machines using digital networks as transmission means are now increasingly being developed and implemented. Some of these facsimile machines use packet switched networks, as described in the following U.S. Pat. Nos.: Crager et al. No. 4,058,672; Crager et al. No. Reissue 31,182; Crager et al. No. 4,058,838; Dennis No. 4,130,885; Ando No. 4,392,222; Asami et al. No. 4,841,373; and Ogawa No. 5,042,028.

Other facsimile machines use storage and forward communications techniques, as illustrated in the following U.S. Pat. Nos.: Crager et al. No. 4,058,672; Crager et al. No. Reissue 31,182; Crager et al. No. 4,058,838; and Harvath et al. No. 5,014,300. U.S. Pat. No. 4,754,428 to Schultz et al. describes a printer protocol, which can be used in facsimile machines. All the foregoing references are incorporated herein by reference.

Other more conventional methods use point-to-point facsimile communication, where a facsimile machine transmits image data to another facsimile machine via a public telephone switching network. These methods of communications can be quite costly. In a storage and forward facsimile communications system a source or originating facsimile machine transmits image data to a first node, which, in turn, transmits the data to a second node, via dedicated lines or a packet switched network. The second node then transmits the image data to a destination or receiving facsimile machine. The use of the storage and forward communication system can be more economical than point-to-point communication. However, when the source facsimile machine finishes transmitting the image data, the destination facsimile machine will not have received the image data, which is still in the node systems.

In a packet switching communications system, a source facsimile machine, such as a Group 3 facsimile machine, can transmit fax document to another Group 3 receiving facsimile machine via a packet switching network. The source facsimile machine transmits image data signals to a packet assembler/disassembler (PAD), which divides the signals into packets, and transmits these packets to a second PAD, via a packet switched network. The second PAD restores the image data signals from the packets, and transmits them to the destination facsimile machine. However, because of the difference in the transmission times of the various packets in the packet switching network, it is possible that the PAD transmits the image data signals from a packet to the destination facsimile machine, without receiving the next packet containing image data signals to be transmitted. This can interrupt the communication between the source and the destination facsimile machines, resulting in a transmission error.

As used herein, the terms "packet switching" and "packet switched" are interchangeable, and refer to a method of transferring data across a network. It divides data into segments, each of which is wrapped in an envelope to form a packet. A typical message comprises one or more packets. Each packet contains the actual user data plus information helpful to its movement across the network, such as addressing, sequencing and error control.

Packet switching is a subset of the traditional message switching (storage and forward), in which data is transmitted in blocks, stored by the first switching node it meets in the network and forwarded to the next and subsequent nodes, until it reaches the destination. No single user or large data block can tie up the circuit or node resources indefinitely.

One of the most important measure of packet switching performance is that of delay. Delay is defined for several different contexts. Cross-network delay is the amount of time a packet takes from the time it enters the network until the time it leaves the network. Such delays are typically in the hundreds of milliseconds.

The fastest rate that scanning lines can be sent to a receiving facsimile unit is determined by the minimum scan line time (MSLT), the time taken by the receiving facsimile unit to print a scan line. The standard MSLT is 20 ms, but it can range from 0 to 40 ms/line depending on the facsimile equipment design. The facsimile transmitter obtains this information from the receiver during handshake (generally in the DIS signal) and does not send faster, but often sends slower.

The actual sending time depends on the number of coded bits per line and the modem speed. The number of coded bits is determined by the amount of black and white information. MR coding gives fewer bits than MH coding. The modem speed is set during handshake. If a coded line at the transmitter is ready, the sending must be delayed by adding fill bits, a string of zeros, which are deleted at the receiver.

Therefore, there is a need for a new facsimile network including a node system, which addresses the concerns of conventional facsimile networks, and which provides adequate solutions and improvement thereto.

SUMMARY OF THE INVENTION

It is an object of the present invention to provide a new data packet-switching facsimile network and a method of operation, for optimizing the utilization of the network capability and for providing the point to point data communication service, over networks such as the INTERNET or Intranet.

It is another object of the present invention to provide a facsimile communications network with almost "simultaneous" transmission and reception of the image data, similar to conventional point-to-point facsimile communication. As used herein, the term "simultaneously" includes an appropriate and acceptable delay, which is generally in the range of hundreds of milliseconds to seconds, or, the term could mean with minimal delay.

It is yet another object of the present invention to provide a packet switching Group 3 facsimile network, in which the facsimile stations operating in accordance with the CCITT Group 3 standard can communicate with each other in a point to point communication fashion.

Briefly, the foregoing and further objects are achieved by providing a new packet-switched facsimile network and method of operation, wherein the facsimile network includes a plurality of source facsimile stations, a plurality of destination facsimile stations, and a plurality of node systems for connecting the facsimile stations.

The network includes subscribers' transmission channels, such as telephone switching network, exchange lines, direct distance dialing lines or private lease lines, for connection to the facsimile stations, and common transmission channels, such as digital circuits via satellite, optical fiber (submarine) cable and digitized analogue cable, packet switched network and ISDN network, for connection to the node systems, in order to allow the facsimile stations to communicate with each other.

According to one embodiment, the network includes a node system that receives data packets from another node system, and that forms image data from the received data packets. The node system selectively inserts fill codes into the image data so that such selective insertion of the fill codes prevents service interruption between the plurality of source data communication devices and the plurality of destination data communication devices by correcting a temporary inability to receive additional data, and by maintaining real time communication between the plurality of source data communication devices and destination data communication devices. The node system is capable of sending the image data and the fill codes to the plurality of destination data communication devices.

DETAILED DESCRIPTION OF THE PREFERRED EMBODIMENT

Figure 1:
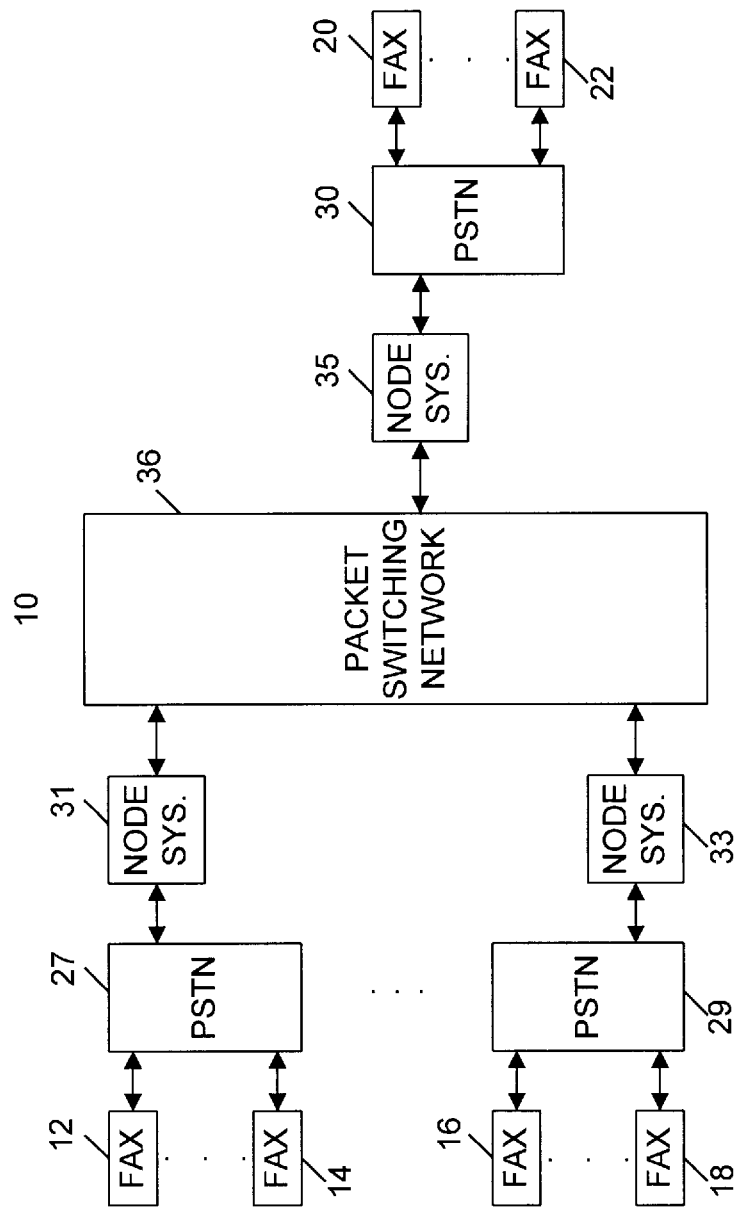
FIG. 1 is a schematic block diagram of a facsimile communications network according to the present invention.

Referring now to the drawings, and more particularly to FIG. 1 thereof, there is illustrated a block diagram of a facsimile communications network 10 according to the present invention. It should be noted that while the communications network will be described in detail relative to a specific exemplary embodiment wherein the network 10 is used as a facsimile communications network, for illustration purpose and not for the purpose of limiting the scope of the patent application. The network 10 includes a plurality of remotely located facsimile stations or machines, such as the facsimile machines 12, 14, 16, 18, 20 and 22. While only six facsimile machines are illustrated, it should be understood to those skilled in the art, after reviewing the present specification, that several other facsimile machines can be used in conjunction with the inventive communications network 10. The facsimile machines are Group 3 machines which operate in accordance with CCITT Group 3 standard (i.e., such as Sharp models OF 120, OF 130 facsimile machines manufactured by Sharp, or RICOH 220, 240 facsimile machines manufactured by RICOH), or other types of data communications devices. It is anticipated that progenies of the Group 3 facsimile machines might be able to use the concept of the present invention.

The network 10 further includes a plurality of local public telephone switching networks (PTSN) 27, 29, 30 for connection to the facsimile machines 12 through 22. It should however be understood that, while only three PTSN's are illustrated, the network 10 can accommodate several other PTSN's. A plurality of node systems 31, 33, 35 are connected between the PTSN's 27, 29, 30 and a packet switching network (PSN) 36, such that, at the same time, the facsimile machines 12 through 22 can inter-communicate, via the node system 31, 33, 35 and the packet switching network 36.

The node system 31, 33, 35 could become part of the telephone system, it would be convenient for providing another economical transmission channel, with the same communication effect, for the facsimile image data transmitted using the public long distance telephone network. Additionally, it would be convenient for setting up a simple access method for the service and for managing the communication fare.

When the node system receives image data from a source facsimile station, it is referred to as a source node system of the facsimile station. Similarly, when the node system transmits image data to a destination facsimile station, it is referred to as a destination node system. In general, in the preferred embodiment, the node system is a "two way" node system, and is capable to simultaneously (i.e., at the same time) receive image data from a plurality of facsimile stations, and transmitting image data to a plurality of other facsimile stations.

Figure 2A:
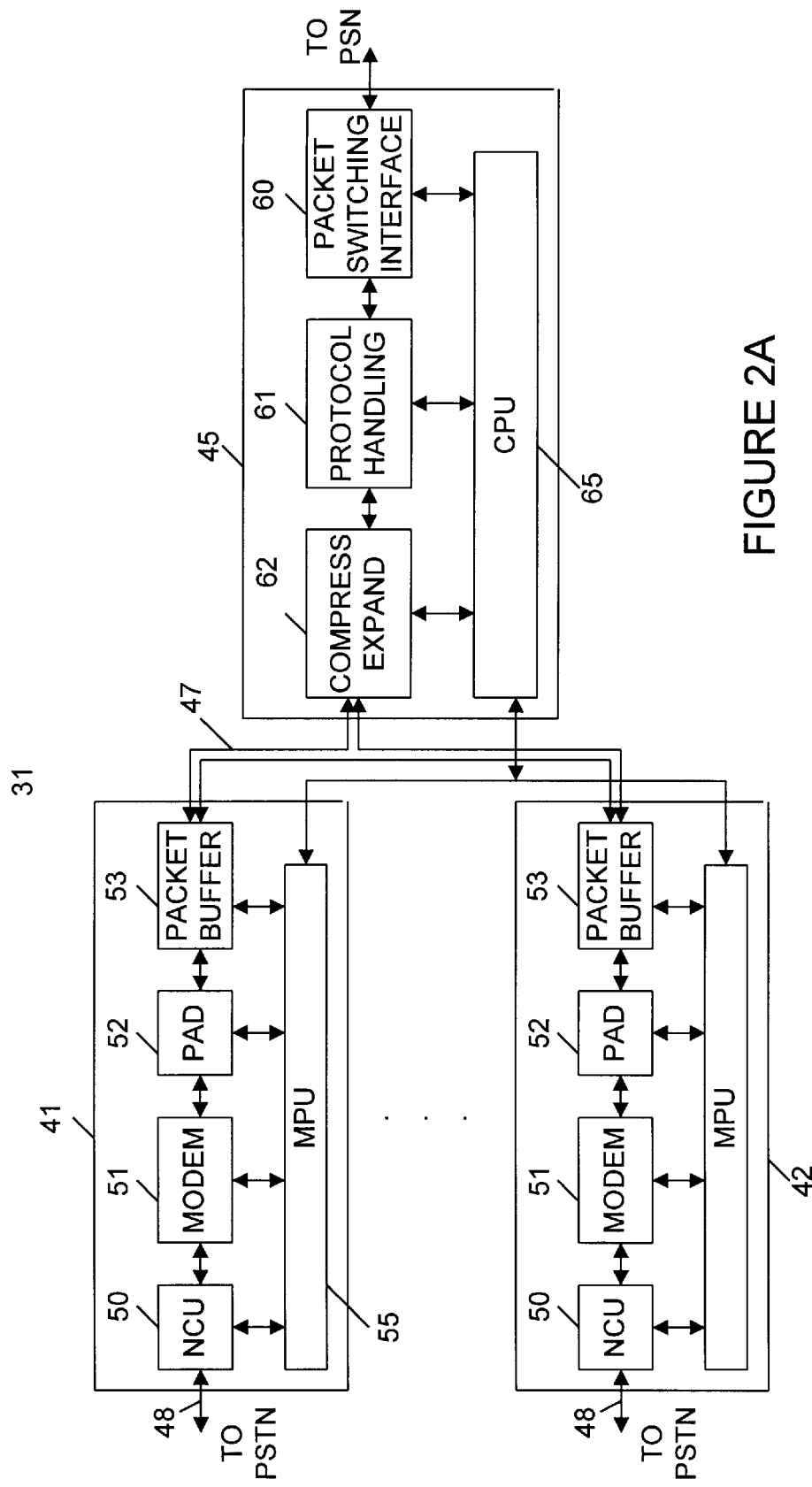
FIG. 2A is a schematic block diagram of an exemplary source node system employed in the facsimile communications network of FIG. 1.

FIG. 2A illustrates an exemplary source node system, such as the node system 31. All the node systems have substantially similar functions and designs, and therefore only the node system 31 will hereinafter be described in greater detail. The node system 31 includes a plurality of generally similar facsimile units 41, 42 which are adaptable for communication with the facsimile machines 12, 14 via the PTSN 27. While only two facsimile units 41, 42 are illustrated, the node system 31 can accommodate a greater number of facsimile units.

A packet communication unit 45 is connected to the facsimile units 41, 42 of the node system 31, and communicates with the other node systems (i.e., 33, 35), via the packet switching network 36. A data bus line 47 connects the facsimile units 41, 42 of the node system 31 to the packet communication unit 45, for enabling the exchange of packets between the facsimile units 41, 42 and the packet 41) can transmit image data to, and receive image data from one facsimile machine (i.e., 12), via the PTSN 27. All the facsimile machines 12 through 22 are capable of simultaneously communicating between each other via the packet switching network 36 at the same time.

Each facsimile unit (i.e., 41) includes a network control unit (NCU) or telephone interface 50 which is connected to the PTSN 27, via an appropriate communications link 48, such as a telephone or cable link. The NCU 50 is connected to a modem 51, which modulates and demodulates the image data to be transmitted or received. The modem 51 is, in turn, connected to a packet assembler/disassembler (PAD), which converts the received image data into data packets, and converts the received data packets into image data.

The PAD 52 is connected to a packet buffer 53 which stores the image data that have been received gradually by the facsimile unit 41, but have not been formed in a packet and sent to the other node systems. The NCU 50, the modem 51, the PAD 52 and the packet buffer 53 are controlled by a microprocessor (MPU) 55.

The packet communication unit 45 includes a packet switching interface 60 which controls the connection of the node system 31 to the packet switching network 36. The packet switching interface 60 is connected to a protocol handling section 61, which provides a communication protocol to the packets to be transmitted into the PSN 36. The protocol handling section 61, is in turn connected to a compressor/expander 62, which compresses the data packets to be transmitted and expands the data packets to be received. The packet switching interface 60, the protocol handling section 61 and the compressor/expander 62 are controlled by a central processor (CPU) 65, which also controls the MPU 55 in the facsimile units 41, 42 of the node system 31. The data bus line 47 connects the packet buffers 53 in the facsimile units 41, 42 to the compressor/expander 62, and allows the facsimile units 41, 42 and the packet communication unit 45.

In operation, the node system 31 receives the image data from one or more source facsimile machines 12 through 14, and transmits corresponding data packets to one or more destination or receiving node systems 33, 35, via the packet switching network 36. Each one of the source facsimile machines 12 through 14 can transmit image data to one facsimile unit 41, or 42 of the node system 31.

The modem 51 demodulates the image data and sends it to the PAD 52, which stores it in the buffer 53. Each time the PAD 52 receives part of the image data, such as image data received in the period of 0.1 second or 1 second, (if the facsimile machine operates at 9600 bps (bits per second) speed, the part of the image data is 960 bits in 0.1 second, and 9600 bits in 1 second,) these image data received gradually in the period of 0.1 second or 1 second are stored in the buffer 53 before they are transmitted to other node systems as a packet, PAD 52 processes the part of image data, and forms a corresponding data packet which includes the image data, address (or addresses) data identifying the destinations for which the packet is intended, and the order of reassembly of the packet in the image data from which the packet was subdivided. The PAD 52 then sends the data packet to the packet buffer 53 to be queued and to await transmission. It is possible to use a common buffer and to reduce the number of buffers 53 in each facsimile unit 41, 42. It is also possible to use a common PAD to replace PAD 52 in each facsimile unit 41, 42.

Thereafter, each of the data packets in the packet buffers 53 is, independently, one by one, sent to the compressor/expander 62, which compresses the data packets and sends them to the protocol handling section 61. The protocol handling section 61 adds the communication protocol and the appropriate address (or addresses) data of the destination node systems to the data packet.

The data packet is then transmitted to the packet switching network 36, via the packet switching interface 60. The packet switching network, in packet multiplex manner, routes and transmits each of the data packets to the appropriate destination node systems (i.e., 33, 35), pursuant to the address (or addresses) data of the destination node systems in the data packet.

The destination or receiving node system, i.e., 35, receives the transmitted data packets from the packet switching network 36, restores the corresponding image data from the data packets, and transmits the image data to the destination facsimile machines 20 through 22. The following is a more detailed description, where similar reference numbers refer to similar or like components.

Figure 2B:
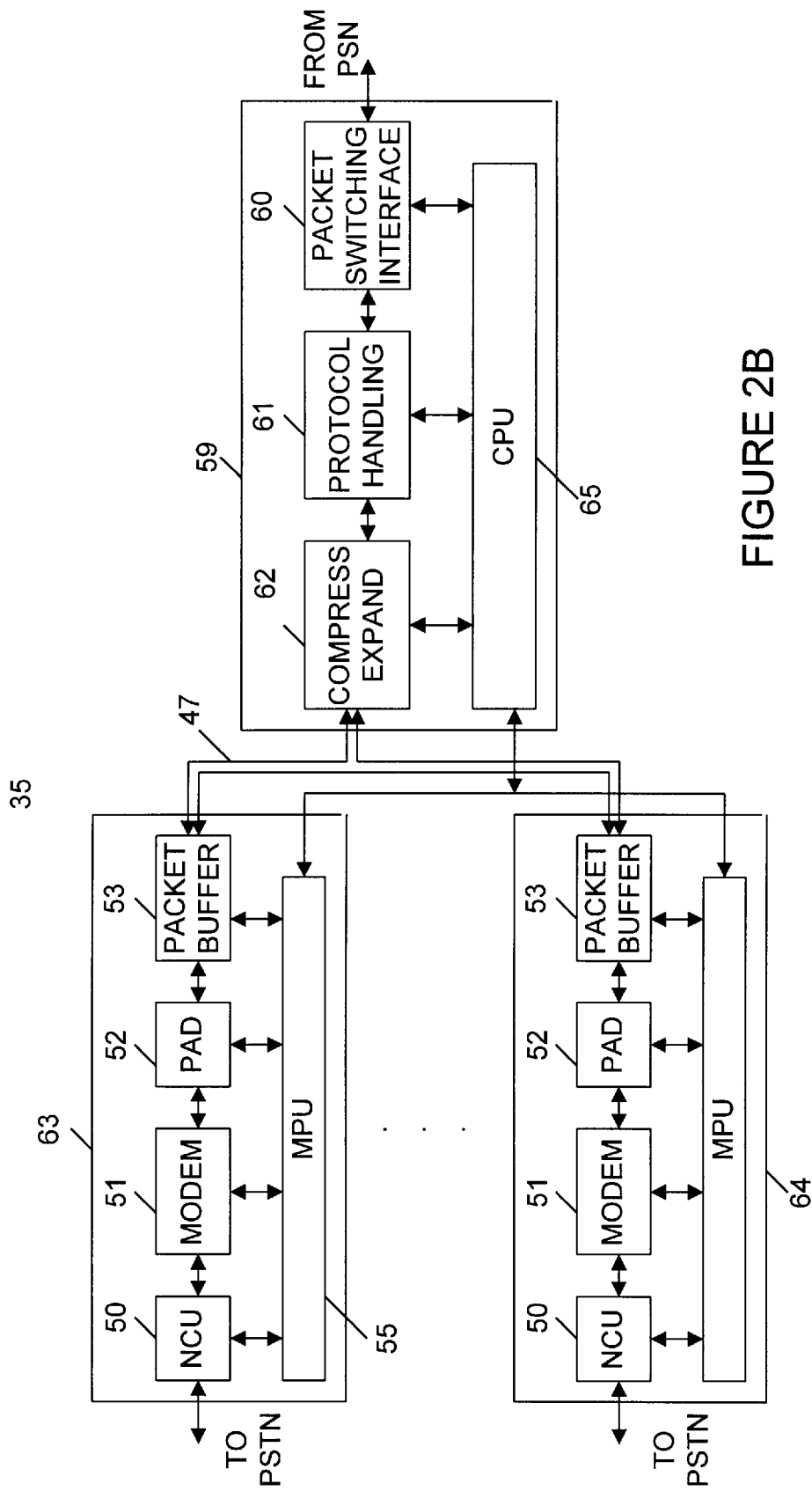
FIG. 2B is a schematic block diagram of an exemplary destination node system employed in the facsimile communications network of FIG. 1.

FIG. 2b illustrates an exemplary destination node system 35, which receives the data packets, via the packet switching interface 60 of the packet communication unit 59, from the packet switching network 36. Each data packet is then sent to the protocol handling section 61, and thereafter to the compressor/expander 62, which expands the data packet. The of one or more destination facsimile units, such as the facsimile units 63 and 64 of the node system 35, according to the address (or addresses) data of the destination facsimile machines in the data packet.

In each destination facsimile unit, the data packet is sent to the PAD 52, which converts the data packet into image data, and then to the modem 51, which modulates the image data and transmits the modulated image data to a corresponding destination facsimile machines 20 or 22, via the NCU 50 and the PTSN 30. If the entire image data of a data packet is transmitted, but the next data packet has not been received by the node system 35, and no image data is sent to the destination facsimile machine, this may result in transmission interruption or transmission error. Consequently, in order to resolve this problem, the facsimile unit 63 causes fill codes to be inserted between the image data, as illustrated in FIGS. 3A and 3B.

Figure 3A:
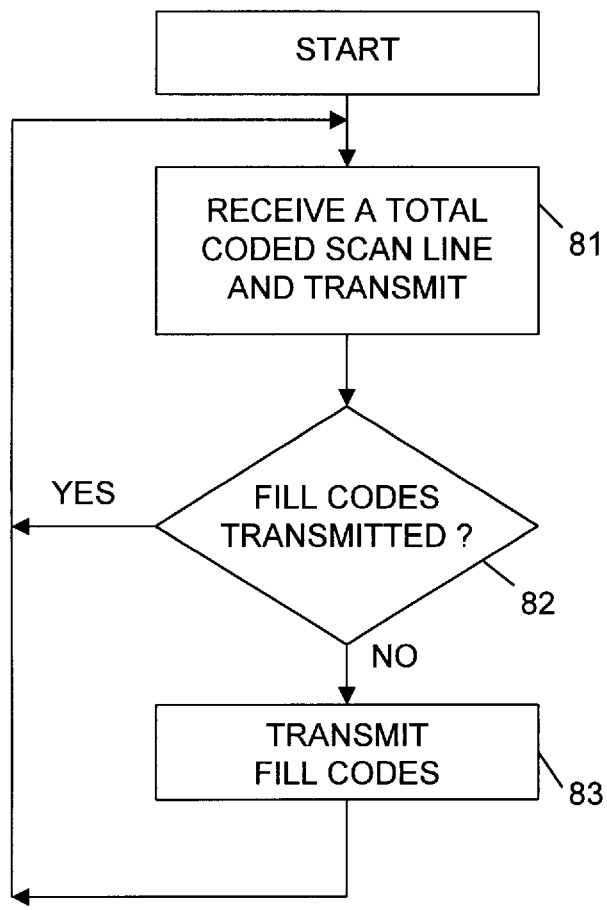
FIG. 3A is a flow chart diagram illustrating the process of inserting fill codes within image data, by a facsimile unit employed in the destination node system of FIGS. 2B.
Figure 3B:
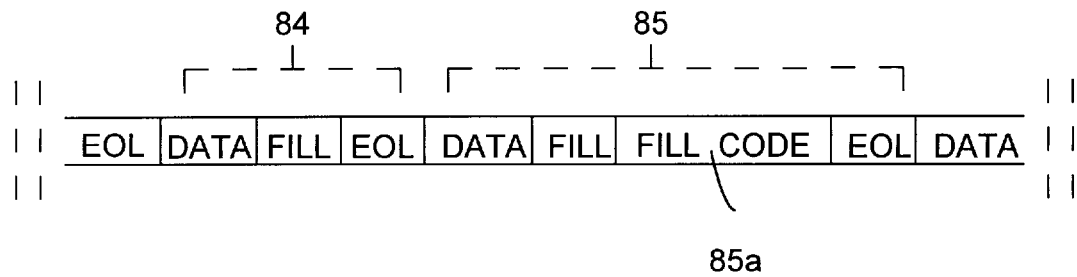
FIG. 3B is a diagram showing the position of the fill codes inserted according by the process of FIG. 3A, within the image data.

FIG. 3A is a flow chart diagram which illustrates part of the operation of a facsimile unit 63 employed in the node systems, such as the node system 35, for converting data packets into image data and for inserting fill codes between the image data. FIG. 3B is a diagram showing the position of the fill codes in the image data after the fill code insertion operation;

As shown by the process block 81, the PAD 52 receives a total coded scan line from the packet buffer 53. In CCITT Group 3 standard, image data is made up by a plurality of total coded scan lines. A CCITT Group 3 standard total coded scan line 84 includes data bits, required fill bits (a string of 0's) and EOL bits (end of line). Then, the PAD 52 sends data bits and required fill bits except the EOL bits of the total coded scan line to the modem 51, for subsequent transmission to the NCU 50.

The facsimile unit 63 then starts the code filling process. At the decision block 82, the MPU 55 in the facsimile unit 63 determines whether the fill codes, to be inserted in the remaining image data at the packet buffer 53 if necessary, would be transmitted for a certain period of time, such as a few of seconds, (i.e., could provide enough delay time). An exemplary fill codes includes a string of 0's. A few of total coded scan lines at the buffer 53 are enough for the purpose. The period of time ensures that, after the wait, the node system 35 should receive the next data packet. The next data packet includes the following image data to be sent to the destination facsimile machine.

If the fill codes are able to provide sufficient delay, the PAD 52 transmits EOL bits, returns to block 81 and continues to send the next total coded scan line 84. If the fill codes are unable to provide sufficient delay, the PAD 52 proceeds to the process block 83, for generating fill codes 85A, a string of 0's, and transmits it after the bits sent by the process block 81. The total coded scan line 85 shows the insertion position of the fill code 85A in the image data. The PAD 52 discontinues the insertion of the fill codes 85A if the packet buffer 53 receives the next data packet, or if the transmission time of the data bits and fill codes reaches the time limit (i.e. 3 seconds) as defined by CCITT Group 3 standard. In which case, the fill codes are inserted in the next total coded scan line and returns to the process block 81, and proceeds with the transmission of the next total coded scan line 84 or 85.

A total coded scan line 85 with fill codes 85A produces the same copy result in the destination facsimile machines 20, 22 as a standard total coded scan line 84. However, it takes a longer time to transmit the total coded scan line 85, which provides a waiting time to receive the next data packet and at the same time keeps the communication between the node system 35 and the destination facsimile machine 20, 22.

Figure 4A:
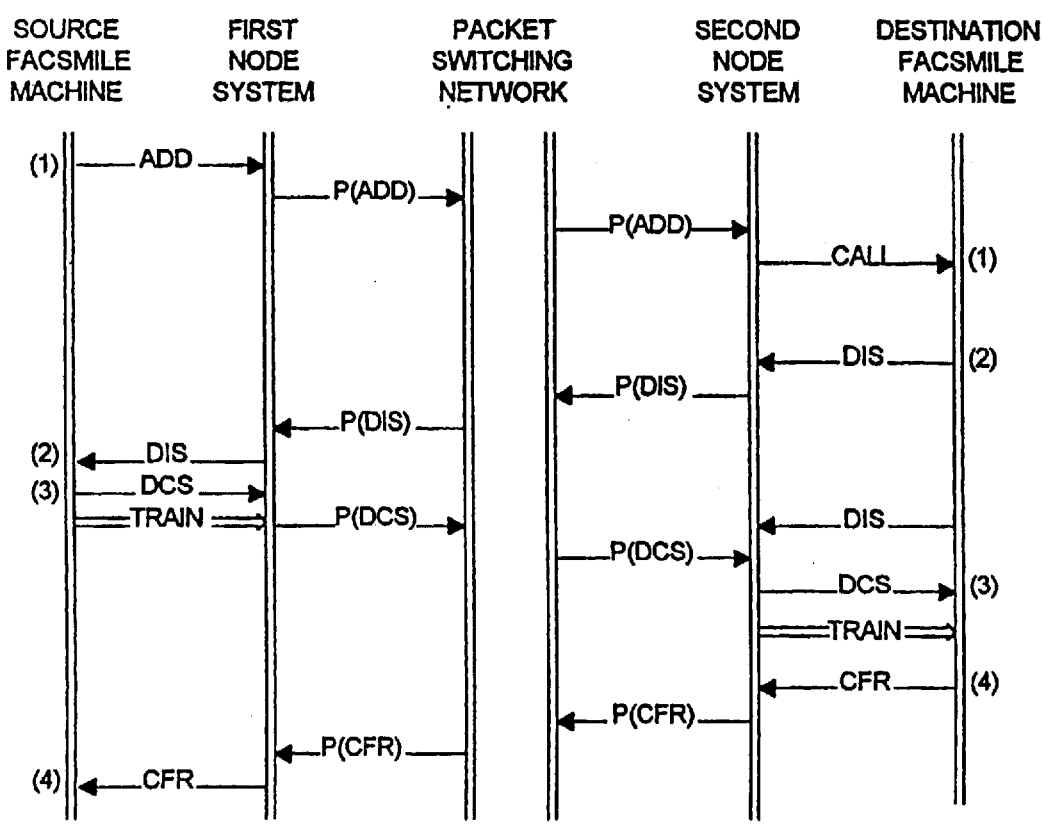
FIGS. 4A, 4B and 4C are exemplary time diagrams or protocols, illustrating a communication method between a source facsimile machine or station and a destination facsimile machine or station, via the facsimile communications network of FIG. 1.
Figure 4B:
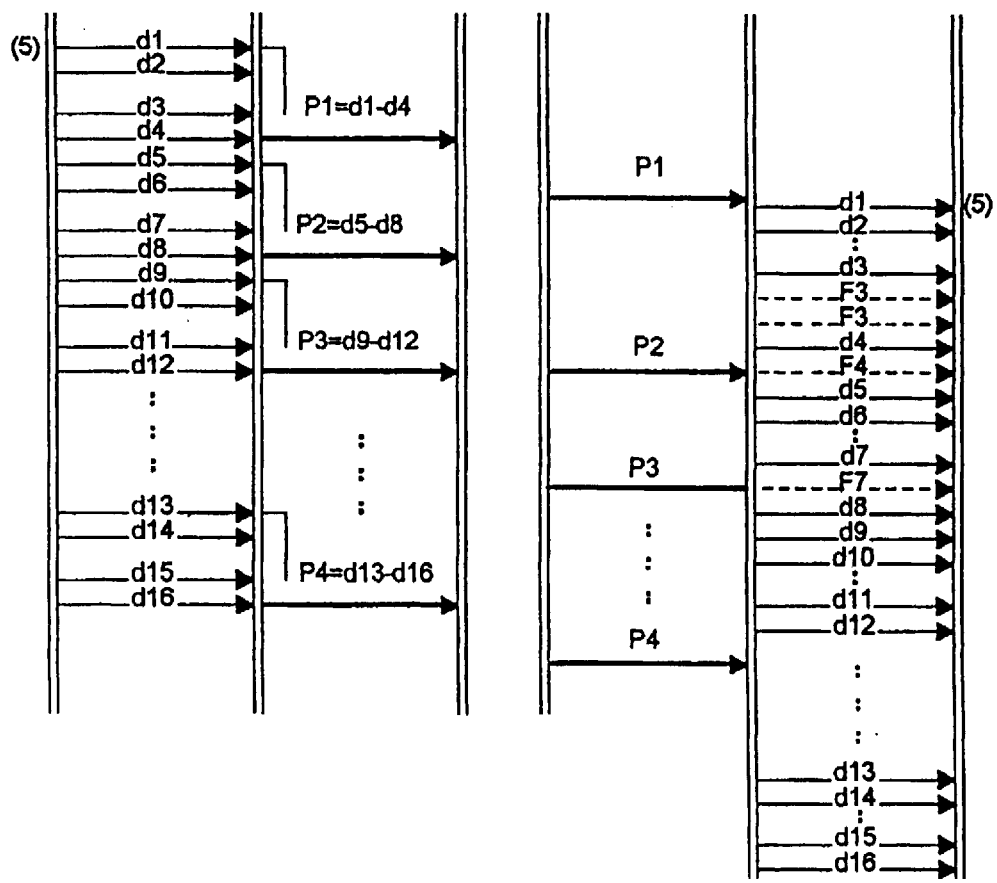
Figure 4C:
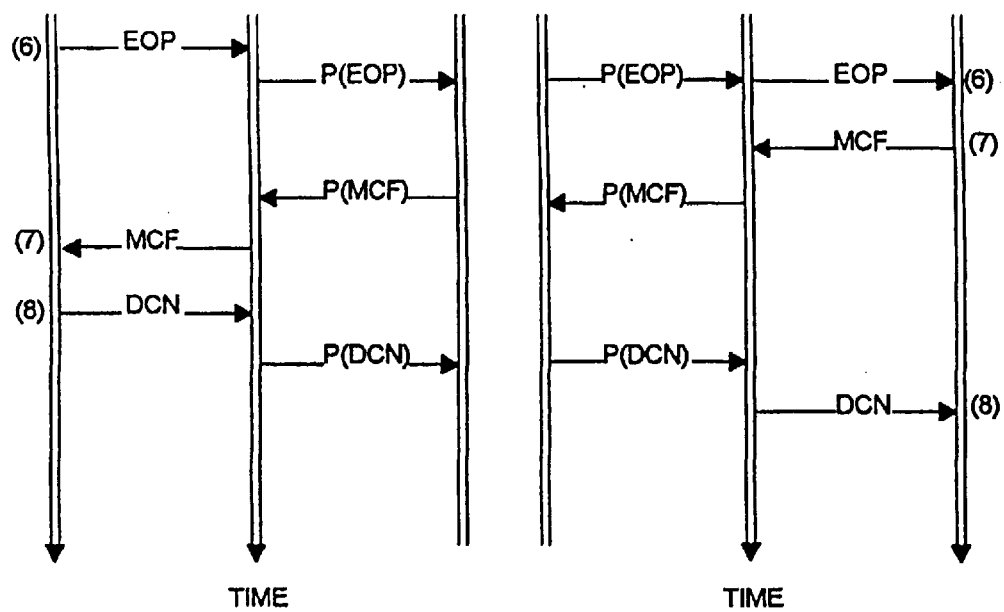

Referring now to FIGS. 4A, 4B and 4C, they represent exemplary time lines, diagrams or protocols for a communication method between the source facsimile machine or station, i.e., 12, and the destination facsimile machine or station, i.e., 22, using the facsimile communications network 10. In this example, the facsimile machines operate in accordance with CCITT Group 3 standard. The time lines (1—1), (2—2), (3—3) and (4—4) of FIG. 4A will now be described.

Starting with time line (1—1), the source facsimile machine 12 places a call to a first local node system 31, via the local PTSN 27. Once the connection with one of the facsimile units, i.e., 41, of the first node system 31, is established, the address of the destination facsimile machine, i.e., 22, is sent to the first node system 31, which forms a corresponding data packet P(ADD).

The first node system 31 then sends the data packet P(ADD) to a second node system, i.e., 35, associated with the destination facsimile machine 22, via the packet switching network 36. Thereafter, the second node system 35, through one of its free facsimile units, i.e., 63, calls the destination facsimile machine 22, and establishes a connection therewith.

The time line (2—2) will now be described. The destination facsimile machine 22 sends a DIS (Digital Identification Signal) to the second node system 35. After receiving the DIS, the second node system 35 processes it and forms a corresponding data packet P(DIS), which contains the DIS data, and sends it to the first node system 31, via the packet switching network 36. The first node system 31 restores the DIS from the data packet P(DIS), and sends it to the source facsimile machine 12.

The time line (3—3) will now be described. In response to the DIS signal, the source facsimile machine 12 transmits a DCS (Digital Command Signal) signal and a Train signal to the first node system 31. After receiving the DCS signal, the first node system 31 forms a corresponding data packet P(DCS) therefrom, and sends it to the second node system 35.

The first node system 31 receives the Train signal to test the quality of the transmission line between the source facsimile machine 12 and the first node system 31. After receiving the P(DCS) packet, the second node system 35 restores the DCS signal and sends it to the destination facsimile machine 22. The second node system 35 also reads the Train signal data from the DCS signal, generates a similar Train signal, and sends the latter Train signal to the destination facsimile machine 22, for testing the quality of the transmission line between the second node system 35 and the destination facsimile machine 22.

The time line (4—4) will now be described. In response to the DCS and the Train signal, the destination facsimile machine 22 sends a CFR (Confirmation to Receive) signal to the source facsimile machine 12, via the second node system 35, the packet switching network 36 and the first node system 31.

Referring to FIG. 4B, the time line (5—5) will now be described. The time line (5—5) illustrates the transmission method of the image data from the source facsimile machine 12 to the destination facsimile machine 22. In response to the CFR signal, the source facsimile machine 12 starts to continuously transmit image data to the first node system 31, until all the image data, for example d1 through d16 forming the document to be faxed, are transmitted.

At the same time, the first node system 31 receives the image data continuously. Every time the first node system 31 receives a part of image data such as image data received in one second, it processes the part of image data, forms a corresponding data packet therefrom which includes the image data, and transmits the data packet to the second node system 35, via the packet switching network 36. For example, the first node system 31 sequentially transmits the packets, one at a time. It begins by transmitting a first data packet P1 which contains, and corresponds to the image data d1–d4. Then, it transmits a second data packet P2 which contains, and corresponds to the image data d5–d8; a third data packet P3 which contains, and corresponds to the image data d9–d12; and finally, it transmits a fourth data packet P4 which contains, and corresponds to the image data d13–d16.

After receiving the first data packet P1, the second node system 35 transmits the corresponding image data d1, d2, d3 to the destination facsimile machine 22. When it sends the image data d3, and it has not received the next data packet P2, it inserts fill codes F3 after the image data d3, and fill codes F4 after the image data d4. If, while the second node system 35 is transmitting the fill codes F4, it receives the next packet P2, it stops sending the fill codes F4, and continues to send the image data d5, d6, d7.

If, when the second node system 35 sends the image data d7, it has not received the next data packet P3, it inserts the fill codes F7 after the image data d7. If, while the second node system 35 is transmitting the fill codes F7, it receives the next data packet P3, it stops sending the fill codes F7, and continues to send the remaining image data d8 through d12. Following the same method, the second node system 35 transmits the image data d1–d16 to the destination facsimile machine 22.

The present example uses fill codes (000 . . . 0), as defined by the CCITT Group 3 standard. The fill codes ensure that the destination facsimile machine 22 does not interrupt the reception. In the present embodiment, if the second node system 35 receives the first data packet P1, and delays the transmission of the image data for a certain period of time, the second node system 35 will not include fill codes during the transmission of all the image data, since this delay would be presumed to have provided a sufficient waiting period for receiving subsequent data packets.

The time lines (6—6), (7—7) and (8—8) will now be described in relation to FIG. 4C. As illustrated by the time line (6—6), the source facsimile machine 12 sends an EOP (End of Procedure) signal to the first node system 31, after transmitting the image data d1–d16. The first node system 31 forms a corresponding data packet P(EOP), and sends it to the second node system 35, which restores the EOP signal and sends it to the destination facsimile machine 22.

Referring now to the time line (7—7), the destination facsimile machine 22, in turn, sends an MCF (Message confirmation) signal to the second node system 35, which forms a corresponding data packet P(MCF), and sends it to the first node system 31, which restores the MCF signal and sends it to the source facsimile machine 12.

As illustrated by the time line (8—8), the source facsimile machine 12 sends a DCN (Disconnect) signal to the first node system 31, which forms a corresponding data packet P(DCN), and sends it to the second node system 35, which restores the DCN signal and sends it to the destination facsimile machine 22.

Some of the facsimile signals which are restored from the data packets and sent to the facsimile machines 12 and 22, by the node systems 31, 35 also include other information from these node systems 31, 35, such as the CFR signal, which includes the test result of the transmission lines between the source or destination facsimile machines 12, 22 and the first and second node systems 31, 35.

Figure 5:
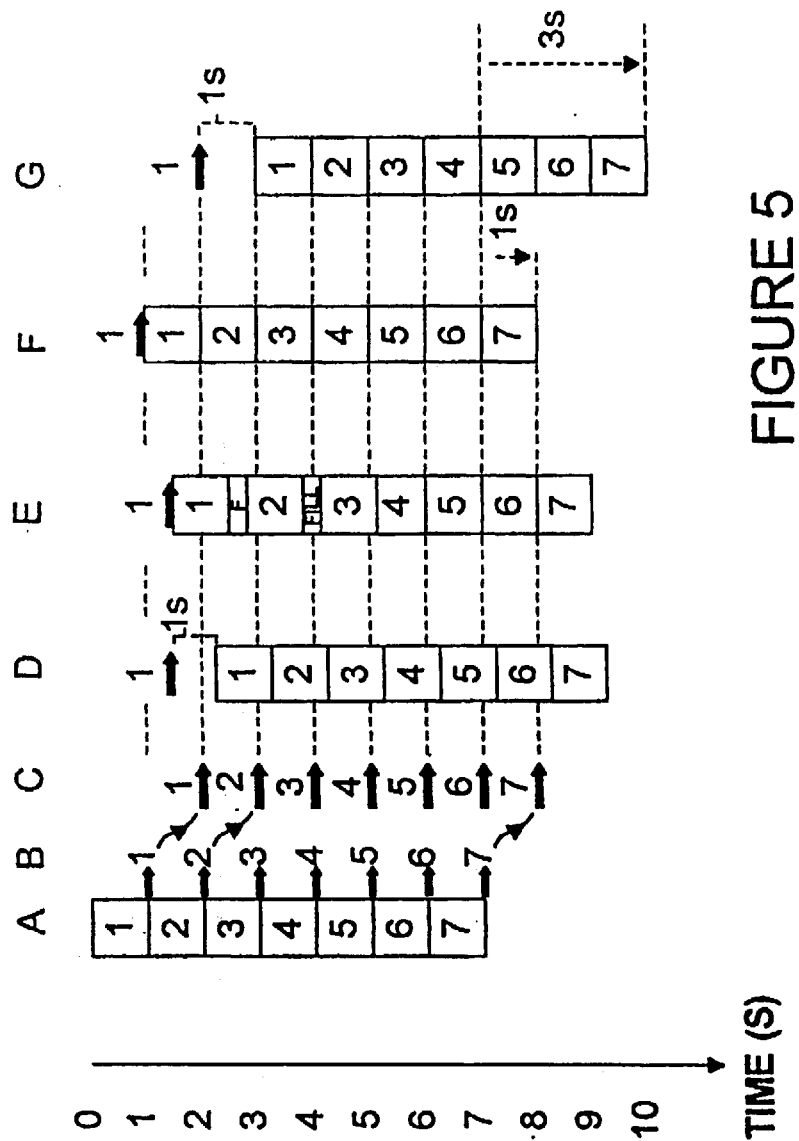
FIG. 5 is a exemplary time diagram illustrating the time difference between the image data transmitted from the source facsimile stations, and the image data received by the destination facsimile stations, using the facsimile communication network of FIG. 1.

Referring now to FIG. 5, it is an exemplary diagram illustrating the time difference between the image data transmitted from the source facsimile machine 12 and the image data received by the destination facsimile machine 22, using the packet switching facsimile network 10 of FIG. 1. Each block in FIG. 5 represents the image data transmitted or received in one second.

Column A shows the image data transmitted by the source facsimile machine 12 and received by the first node system 31. Column B shows that each time the first node system 31 receives image data for one second, it forms a data packet therefrom, and sends the data packet to the packet switching network 36. Column C shows the data packets received by the second node system 35 at the latest. Generally, data packets are received ahead of time. Here, we suppose that each data packet sent out by the first node system 31 is received by the second node system 35 in one second, (the maximum packet cross-network delay is one second).

Column D shows that after receiving the first data packet, the second node system 35 delays for one second before sending the reconstructed image data (block 1) therefrom to the destination facsimile machine 22. In this case, when the second node system 35 sends whatever image data (block 1 to block 7) to the destination facsimile machine 22 in order, the second node system 35 must have received the data packet that includes the image data. If we delay for a certain period of time, such as one second, before sending the first part of the image data to the destination facsimile machine, the second node system does not need to insert the fill codes into image data in the following transmission. (Compare columns D and C).

Column E shows that after receiving the first data packet, the second node system 35 sends the image data (block 1) to the destination facsimile machine 22 at once, and transmits the fill codes, if necessary, as described in FIG. 4. In this case, if the transmission time of the fill codes adds up to one second, we do not need to insert fill codes in the subsequent image data transmission, and the entire image data delay is limited. According to CCITT Group 3 standard, a total coded scan line may be transmitted for three seconds, and generally the data bits of the total coded scan line are transmitted in a short time such as less than 100 ms, so there remains more than 2.5 seconds during which time it is possible to insert fill codes. So, generally, we can transmit image data at the buffer until the last total coded scan line, then if necessary we insert the fill codes into the last total coded scan line.

Column F shows the best case scenario, where the second node system 35 receives the data packets as soon as the data packets are sent out by the first node system 31. When the source facsimile machine 12 finishes transmitting the image data (block 7), the destination facsimile machine 22 receives the image data with one second delay.

Column G shows the worst case scenario, where the second node system 35 receives the first data packet at the latest (i.e., one second delay). Then the second node system 35 waits for another one second before sending the image data (block 1) to the destination facsimile machine 22. In which, after the source facsimile machine 12 finishes transmitting the image data (block 7), the destination facsimile machine 22 receives the image data (block 7) with a three-second delay.

A comparison of columns F and G illustrates that the image data delay through the network 10 is between 1 and 3 seconds. In fact, the delay is mainly determined by the packet size, such as a packet including 0.1 second or 1 second image data, and the transmission time of the packet in the packet switching network. The image data delay of the present invention typically ranges between hundreds of milliseconds to a few of seconds.

In the above embodiment, a packet switching network 36 is employed to transmit data packets. However, alternative transmission channels, could be used instead. For instance, a long distance regular telephone circuit (0.3–3.4 kHz) is used as a dedicated transmission channel for connecting the two node systems 31 and 35, and a full duplex 19200 bps modem is used as the packet switching interface in the node systems 31, 35. The original image data from the facsimile machine is compressed to half size of its original, by the compressor 62 of the node systems 31, 35. Group 3 facsimile machines 12, 14, 20, 22 transmit and receive image data with 9600 bps speed, with the transmission time of the image data being 80% of the total communication time of the facsimile machines. Consequently, we obtain the result shown by the following equation:

$$2(duplex) \times 19200\ bps \times 2(compressed)/9600\ pbs/80\% = 10$$

In other words, ten (10) source and ten (10) destination facsimile machines can communicate with each other, in a similar way to the convention point-to-point communications method over the long distance regular telephone circuit, where only one source and one destination facsimile machines can communicate with each other.

The transmission capacity of a conventional telephone line is not constant. In a regular telephone line (0.3–3.4 KHz), with 2400, 9600 or 19200 bps (bits per second) modem, the capacity is 2400, 9600 or 19200 bps, respectively. With full duplex modems, the data can be transmitted in two directions at the same time. The regular telephone line can support full duplex modems. If the original data were compressed, the amount of original data sent on the line increases.

In the present example, we use full duplex 19200 bps modems, so the regular telephone line can transmit data at 2*19200=38400 bps. The original data is compressed to half its size, the telephone line can transmit original data at 2*38400=76800 bps. If the Group 3 facsimile machines transmit original data at 9600 bps, the line can have the capacity to transmit original data from 76800/9600=8 facsimile machines. The Group 3 facsimile machine transmits other messages generally at 300 bps besides the image data, considering the discount as 20%, the regular telephone line, in the present invention, at the same time, can transmit data from 8/(1–0.20)=10 facsimile machines.

In the conventional point-to-point long distance facsimile communication, the transmission speed of the image data is determined by the quality of the transmission line from the source facsimile machine, i.e., 12, to the local PTSN 27, the communications line from the local PTSN 27 to another local PTSN 30, and therefrom to the destination facsimile machine 22. In the point to point facsimile communication of the present invention, in the network 10 the transmission speed of the source facsimile machine 12 is determined only by the local PTSN 27, and so is the transmission speed of the destination facsimile machine 22. The transmission speed of the image data in the source and destination facsimile machines tends to be faster than in the point-to-point facsimile communications. So it is possible for subscriber to take less transmission time to complete the transmission of the image data in the network 10 by the point to point operation method of present invention than in the conventional point to point facsimile communications.

If a poor quality transmission line results in a slower transmission speed, it takes a user a longer time to occupy a long distance telephone line for communication in conventional point-to-point communication. However, in the network 10 of present invention, the subscriber takes more time to occupy only in a local telephone line. In long distance line, the subscriber transmits constant data bits which are determined by the size of the image only, and the transmission time of the data bits in the distance line is not changed by the transmission speed in the local line, whether it is 9600 or 4800 bps. In this case, the line can be further used to transmit packets from other facsimile communication, such as another 4800 bps facsimile communication can be added into the line, and the line further transmits data packets from the facsimile communication.

Figure 6:
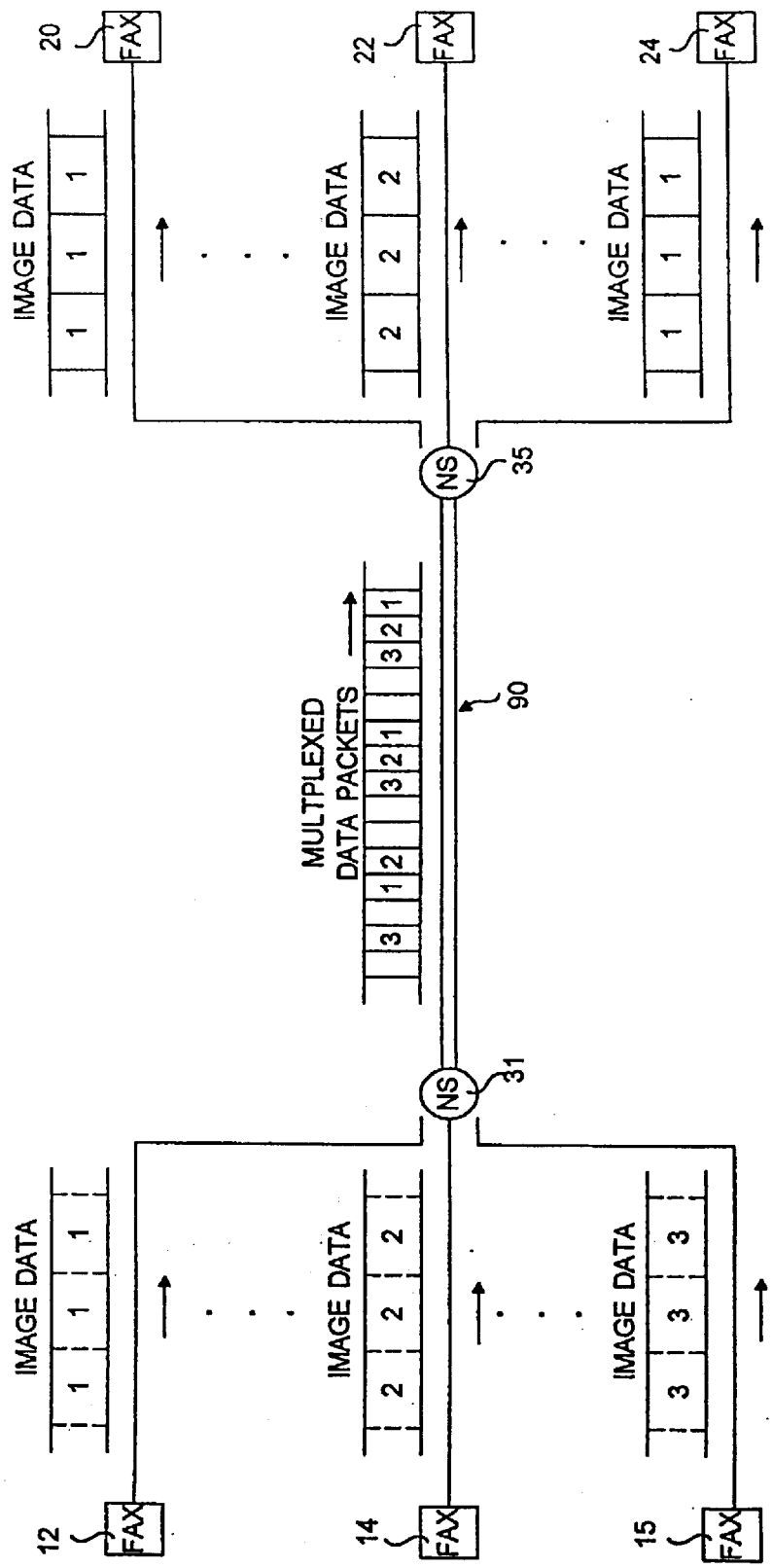
FIG. 6 is a diagram illustrating the general operation of the communication method between a plurality of source facsimile stations and a plurality of destination facsimile stations, using the facsimile communications network of FIG. 1.

FIG. 6 illustrates the general operation of the communication method between a plurality of facsimile machines, using the facsimile communications network 10. At the first node system 31, the image data received from a plurality of facsimile machines 12, 14, 15 are divided into data packets, as illustrated by the numerals 1, 2, 3. The data packets are multiplexed and transmitted, via a common communication channel or link 90, or the packet switching network 36, to the second node system 35. The image data are then restored from the received data packets and are transmitted to the appropriate destination facsimile machines 20, 22, 24. This ensures that the image data from a plurality of source facsimile machines can be transmitted to the appropriate destination facsimile machines simultaneously.

Figure 7:
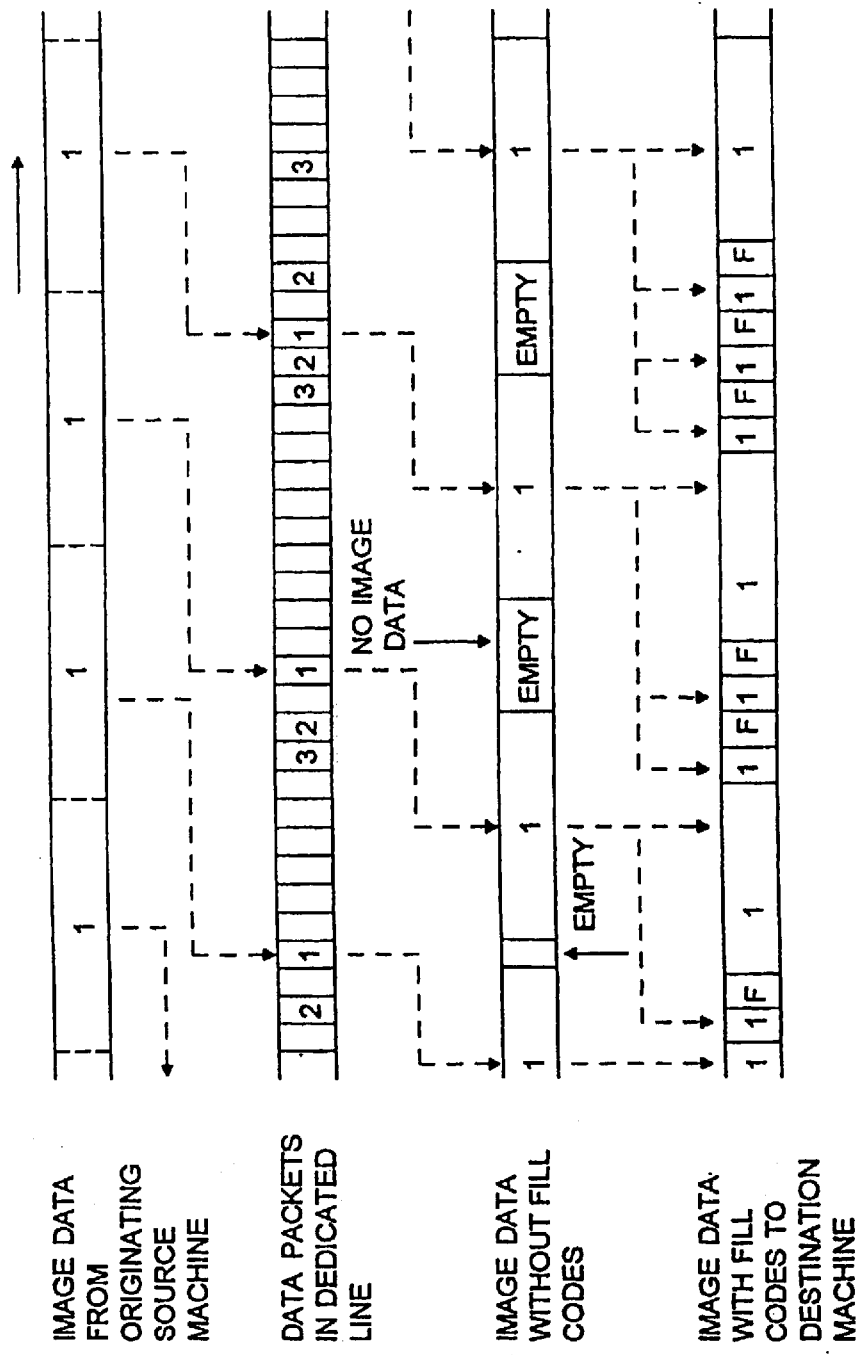
FIG. 7 is a diagram illustrating the use of fill codes to improve the general operation of the facsimile communications network of FIG. 1.

FIG. 7 illustrates the code filling process. Because of queuing and different transmission times of the data packets in the common communication channel 90 or packet switching network 36, it is possible that the image data restored from the received data packets is sent out to the destination facsimile machines; however, the next data packets are not yet received. This may cause an interim interruption of the image data transmission to the destination facsimile machines, which may possibly lead to an interruption in the communication. This problem can be avoided by inserting fill codes (F) between the image data.

Figure 8:
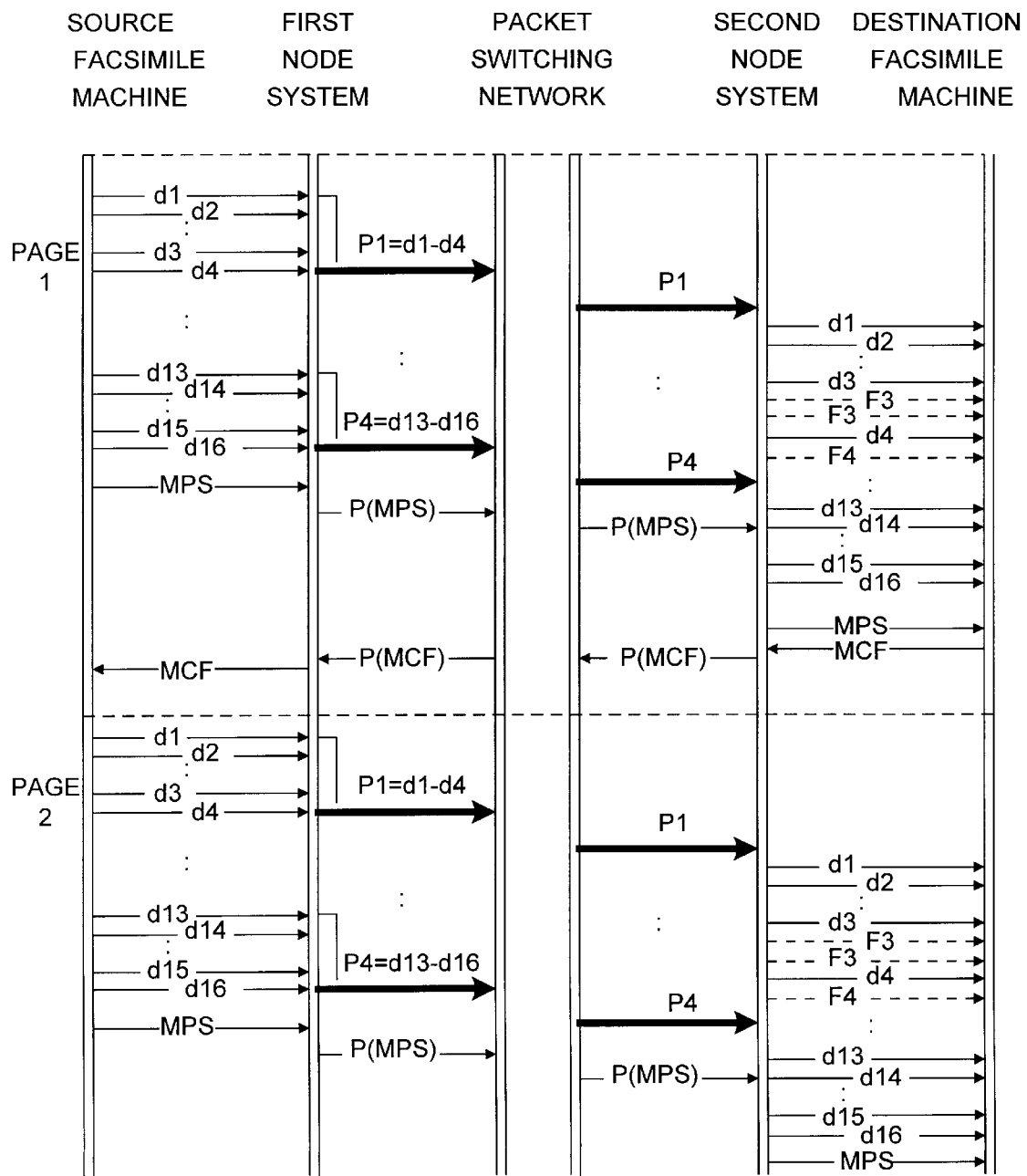
FIG. 8 is an exemplary time diagram and a series of protocols illustrating an image data communication method of multiplex pages between a source facsimile station and a destination facsimile station, via the facsimile communications network of FIG. 1.

Referring now to FIG. 8, which represents exemplary time lines, diagrams or protocols for a multiplex pages image data communication method between the source facsimile machine, i.e., 12, and the destination facsimile machine, i.e., 22, using the facsimile communications network 10. In this example, the facsimile machines also operate in accordance with CCITT Group 3 standard. In FIG. 8, Image data of each page is transmitted by the same method shown in FIG. 4B, then the MPS (multiplex page signal) and the P(MPS) packet connects pages. For example, after the source facsimile machine 12 finishes transmitting image data in page 1, the source facsimile machine sends a MPS signal (instead of EOP signal). The first node system 31 receives the MPS, forms a P(MPS) packet and sends it to the second node system 35. Then the second node system 35 generates a MPS signal and sends it to the destination facsimile machine 22. The MPS signal indicates that there is another image data in next page and asks the destination facsimile machine 22 to receive. The destination facsimile machine 22 generally returns a MCF signal and is ready to receive the following image data in page 2.

Figure 9:
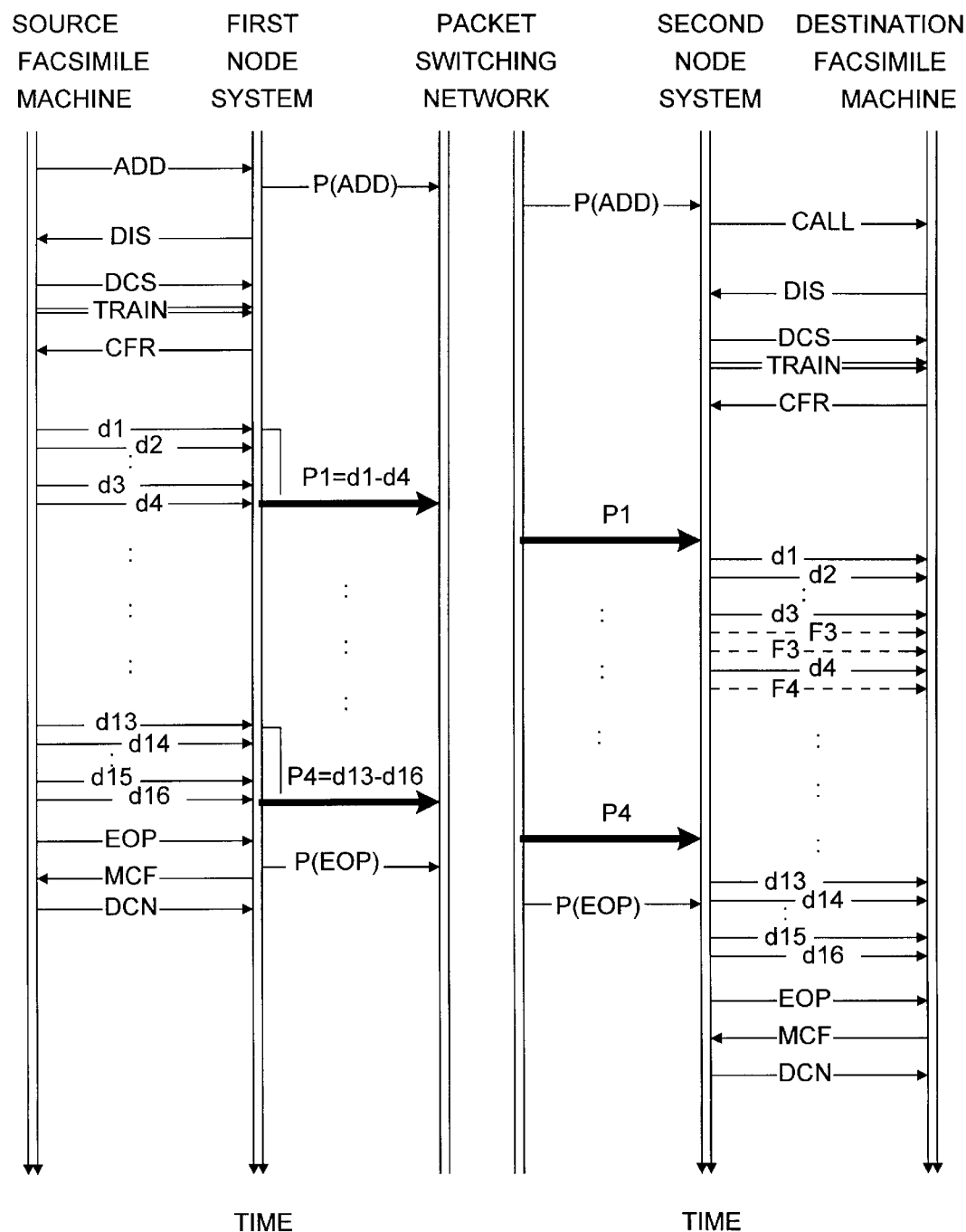
FIG. 9 is exemplary time diagram and a series of protocols, illustrating another communication method between a source facsimile station and a destination facsimile station, via the facsimile communications network of FIG. 1.

Referring now to FIG. 9, which represents exemplary time lines, diagrams or protocols for another communication method be, 12, and the destination facsimile machine, i.e., 22, using the facsimile communications network 10. In this example, the facsimile machines also operate in accordance with CCITT Group 3 standard. In FIG. 9, image data is transmitted by the same method shown in FIG. 4B, but there is some difference in the processing of facsimile communication handshake signals. Here the source and destination facsimile machine's handshake signals (such as DIS, DCS, DCN, CFR and MCF) are not formed into packets and transmitted via the packet switched network 36. The source facsimile machine 12 and first node system 31 communicate independently, and the first node system 31 generates required facsimile communication signals (such as DIS, CFR and MCF); the second node system 35 and the destination facsimile machine 22 communicate independently, and the second node system 35 generates required facsimile signals (such as DCS, and DCN). The packet switched network 36 mainly transmits image data packets.

Figure 10:
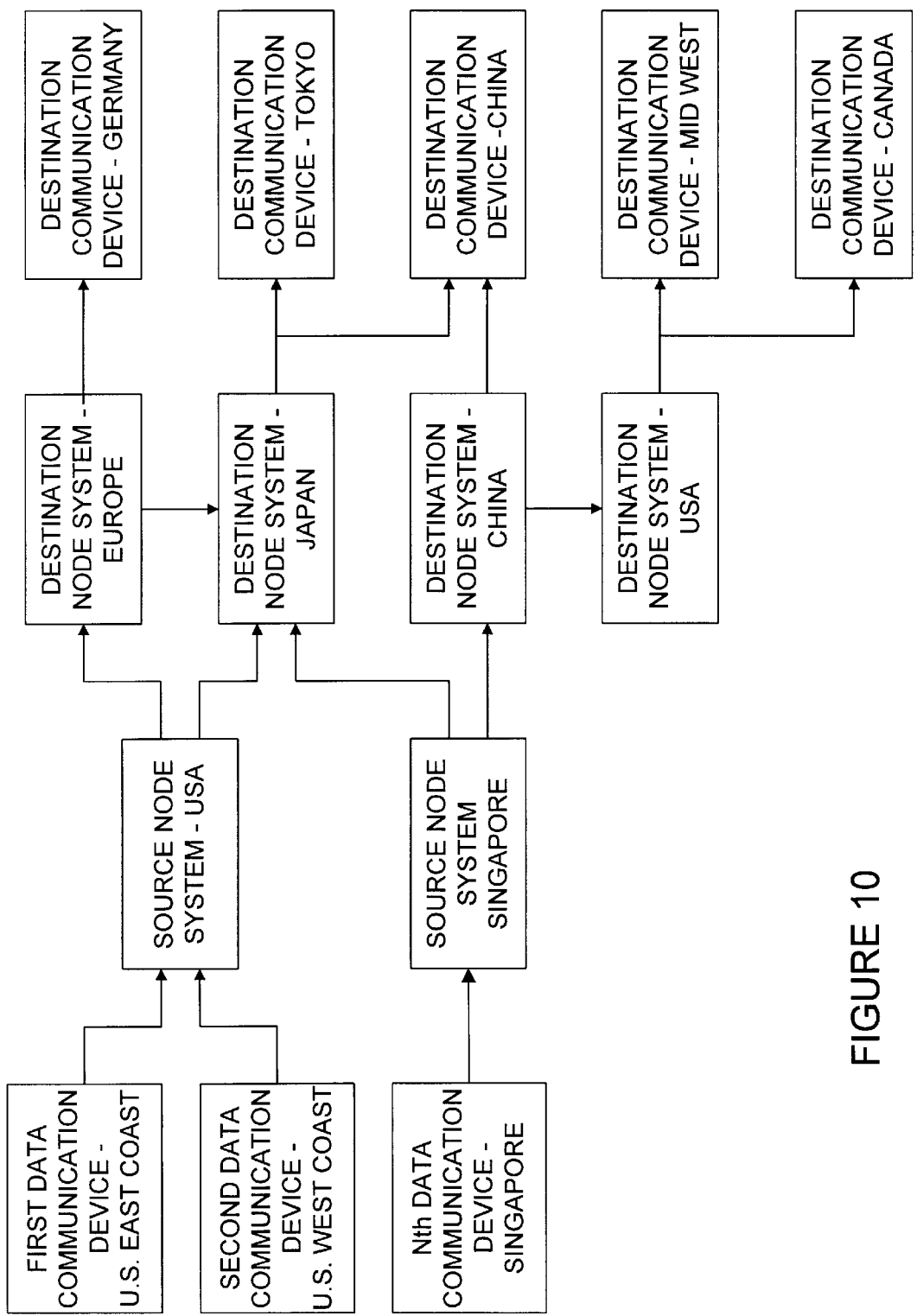
FIGS. 10 through 18 are block diagrams of other applications of the communication network.

Referring now to FIGS. 10 through 18, the data communications network 10 of the present invention is not limited to facsimile machines. In fact, the network 10 may be used for transmitting image data as well as digitized moving video data over a variety of communications networks, including the Internet and the Intranet. FIG. 10 provides a general illustration of such exemplary network whereby the first, second and $N^{th}$ data communication devices may be personal computers (PC's) or other systems capable of transmitting data (including image and digitized and compressed moving video data) to various source nodes. In this example, either the source node systems or the data communication devices may be local or remote Internet or Intranet servers, such as America On Line®, Prodigy®, Compuserve® and similar other Internet service providers.

The source node systems in turn transmit the data to a plurality of destination node systems at various locations. The destination and source node systems are capable of communicating amongst themselves. The destination node systems then process the received data, as explained herein, and transmit it to various destination communication devices. In this example, either the destination communication devices or the destination node systems may be the local or remote Internet or Intranet servers.

Figure 11:
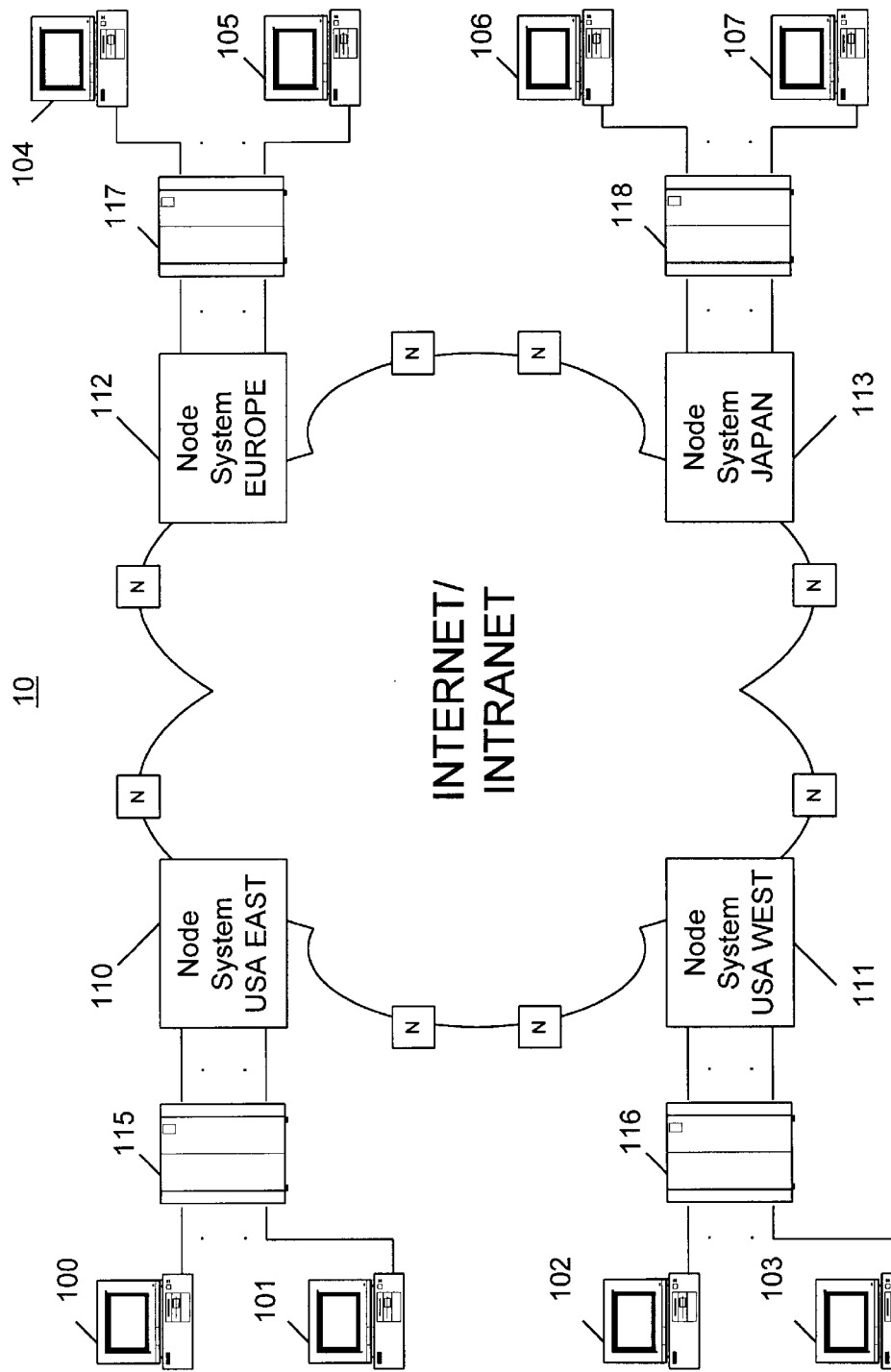

FIG. 11 shows a real-time data communications network 10 that uses the Internet communications system for sending data between data communication devices, such as 100, 101, 102, 103, 104, 105, 106, 107, etc. While only eight data communication devices are shown, it should be clear that a different number, and particularly a much greater number of data communication devices may be used. In one embodiment, at least some of the node systems 110, 111, 112, 113 of the network 10 may be, or may include a host or a server connected to a LAN (local area network) such as Ethernet, and the LAN itself is connected to the Internet. Data from the source data communication device, i.e., 100, is transmitted from the node system 110, through the local LAN, the Internet and the destination LAN, to the destination node system, i.e., 111, 112, and/or 113, which, in turn, sends the data to the corresponding destination data communication device or devices, i.e., 102 through 107. The data packet from the source node system 110 to the destination node system or systems 102 through 107 is formatted as an Internet IP datagram. The boxes labeled "N" that are connected intermediate the various nodes systems, i.e., 110, 111, 112, 113, etc., may be and/or may include other node systems and/or switching systems.

The node system, i.e., 110, is connected to a plurality of data communication devices and sends and receives data stream to and from these plurality of data communication devices via a plurality of public (or public) switches (telephone, video or other data communications switches), i.e., 115, 116, 117, 118. These switches 115–118 may include and/or may be connected to cable modems for connection to the data communication devices 100–107.

Figure 12:
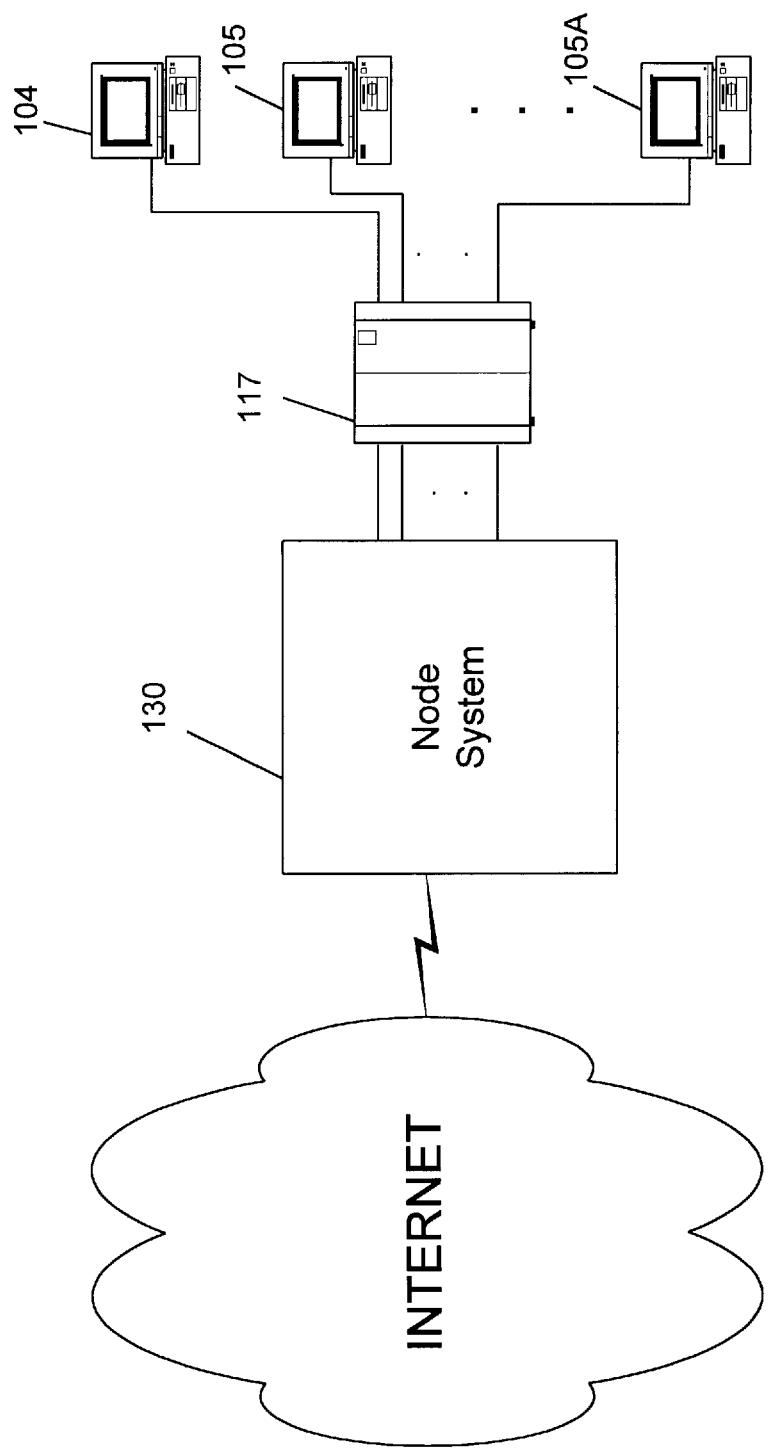

FIG. 12 shows a node system 130, which could be and/or include, for instance, node 35 of FIG. 1 and/or node 112 of FIG. 10. The node system 130 may be a host or a server of a LAN that is connected to the Internet network by the router or gateway. As a result, the node system 130 may include a interface that connects it to the LAN. If the LAN were Ethernet, then the interface may include an Ethernet card and an Ethernet device driver (not shown). The node system 130 may use IP protocol to send and receive data packets with other node systems over the Internet. The node system 130 includes a plurality of interfaces for the data communication devices in order to communicate with (i.e., send and receive data stream to and from) a plurality of data communication devices, such as 104, 105, 105A, etc.

Figure 13:
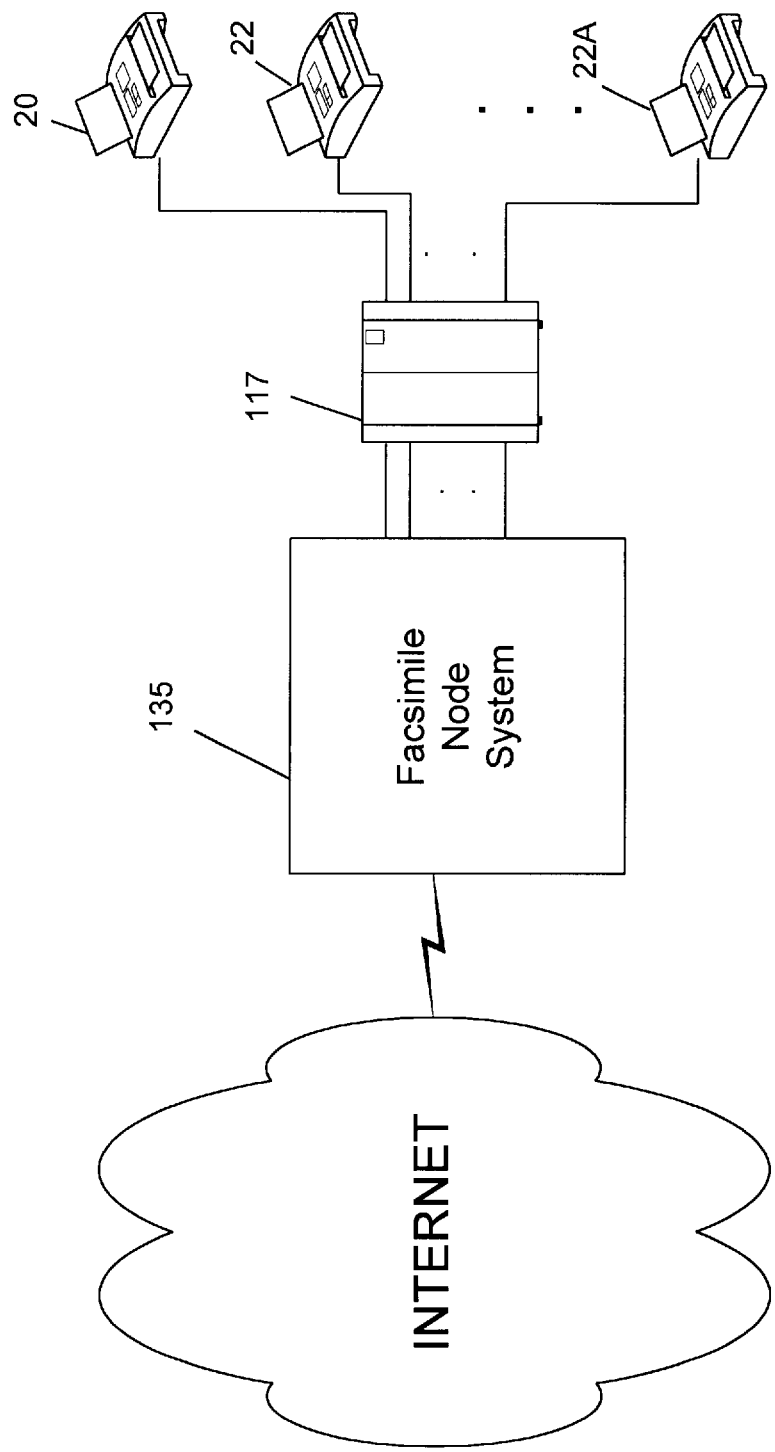

FIG. 13 illustrates a specific example or application of the data communications network 10, whereby it includes a facsimile node system 135, which could be and/or include the facsimile node 35 of FIG. 1. The facsimile node system 135 may be a host or a server of a LAN which is connected to the Internet system by the router or gateway. As a result, the facsimile node system 135 may include an interface connected to the LAN. If the LAN were Ethernet, then the interface may include an Ethernet card and an Ethernet device driver. The node system 135 may use IP protocol to send and receive data packets with other node systems over the Internet. In this specific illustration of the facsimile node system 135 of the present invention, the node system 135 include a plurality of interfaces for connection to a plurality of facsimile machines, i.e., 20, 22, 22A, etc., in order to communicate with (i.e., send and receive facsimile document to and from the plurality of facsimile machines 20, 22, 22A, etc.). A facsimile interface generally can operate the facsimile protocol, and has a modem to send and receive facsimile data stream, and a telephone interface for connection to the facsimile machines.

Figure 14:
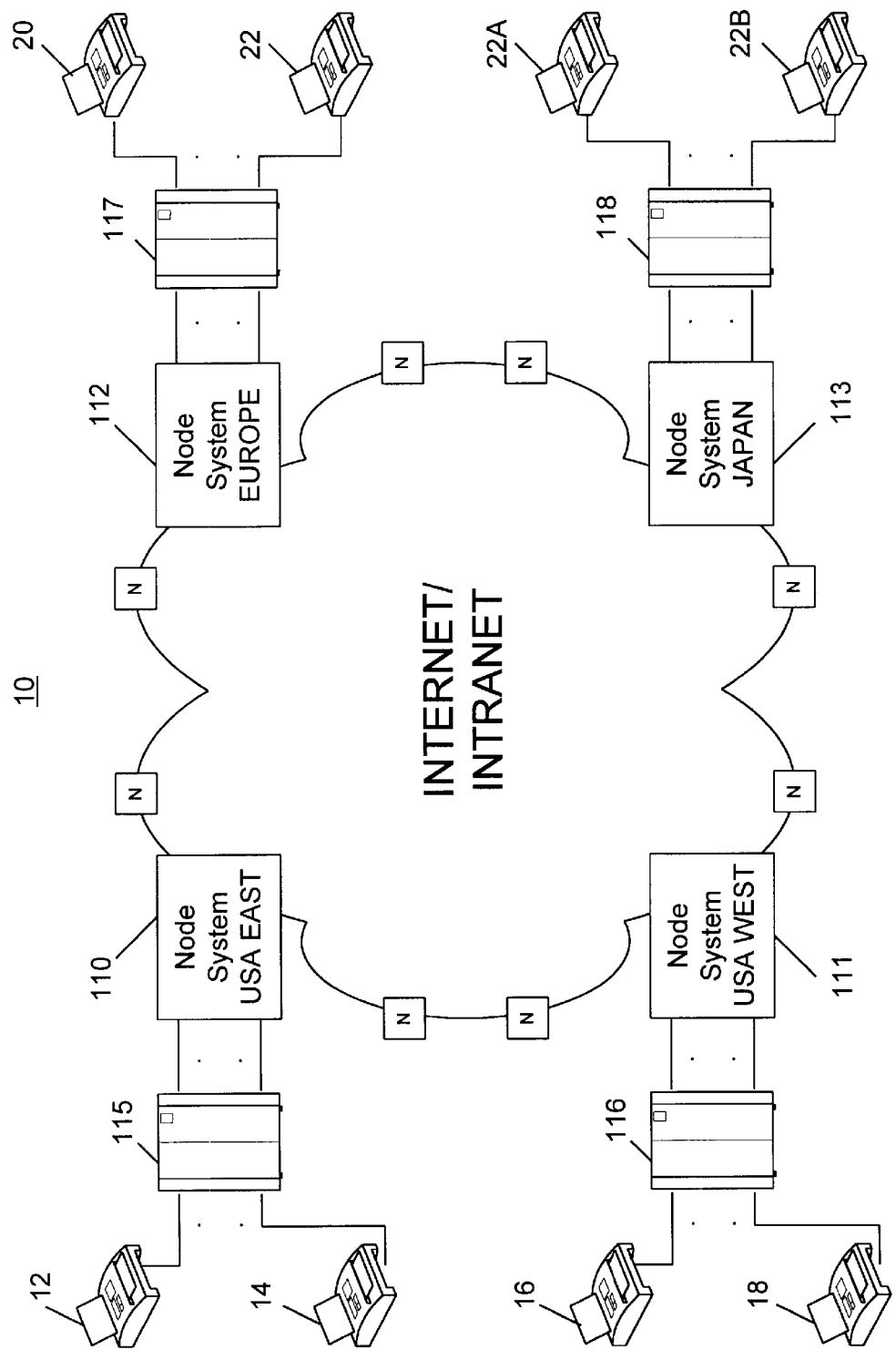

FIG. 14 shows another exemplary application of the data communications network 10, for illustration purpose, which includes and/or includes a real-time facsimile network which sends data between a plurality of machines, such as 12, 14, 16, 18, 20, 22, 22A, 22B via the Internet. One or more of the node systems, i.e., 112., of the network 10 may be a server which is connected to a LAN, and the LAN is connected to the Internet via a router or gateway. The node system, i.e., 112, may be connected to a plurality of fax machines, i.e., 20, 22, via a public and/or a private switch, and the facsimile machine may include a cable modem. The data packet that includes a part of facsimile data from the source fax machine, goes through source node system 110, the local LAN, the Internet and the destination LAN, to the destination node system 112, which, in turn, sends the data stream to the destination facsimile machine, ie., 20, as described herein. The data packet from the source node system 110 to the destination node system 115 may include the Internet IP datagram.

Figure 17:
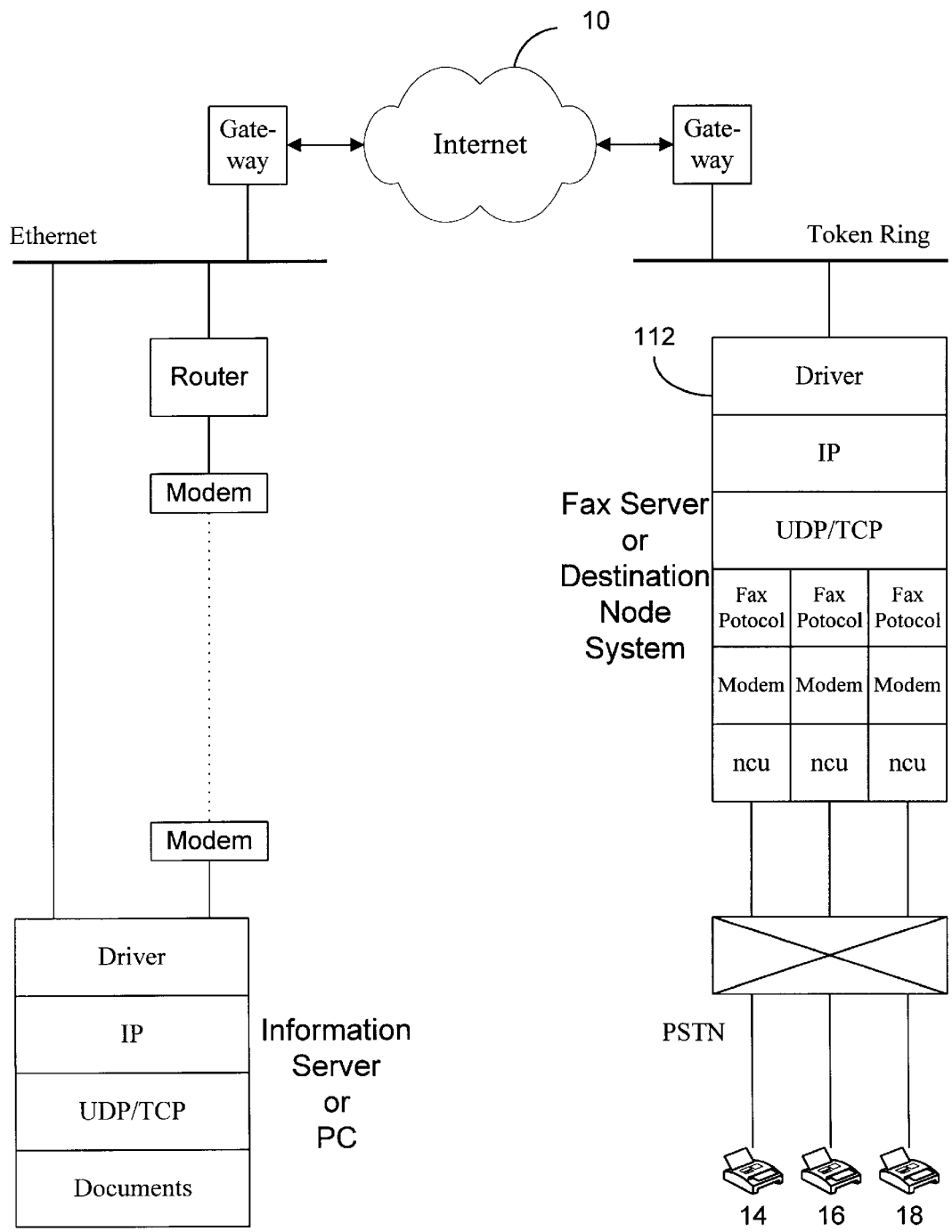

With reference to FIG. 17, For example, a personal computer (PC) sends a facsimile document to a facsimile machine, i.e., 14, over the Internet 10. The PC is connected to a local area network (LAN) by dial-up modem. The LAN is connected to the Internet 10 via a gateway. A destination node system or facsimile server 112 is connected to a gateway that is connected to the Internet 10. The destination node system 112 is able to use facsimile modems to connect to facsimile machines, i.e. 14, 16, 18. It is established PC can directly communicate with a node or server over the Internet by using the Internet TCP/IP protocol. Considering that the PC communicates with the destination node system 112 over the Internet 10 using TCP/IP protocols. The PC first connects to the destination node system 112 through the Internet 10 and sends the command to request that the destination node system 112 connects to a destination facsimile machine such as 14, by one of its fax units (a set of fax protocol, modem and ncu). Then, the PC divides the fax document into data packets such as Internet UDP datagram, and adds reliable transmission operation similar to TCP operation, and sends data packets to the destination node system by using Internet IP operation. When the destination node system 112 receives some data packets (datagrams), the destination node system recovers a part of fax document from these data packets and sends the part of fax document to the destination facsimile machine 14, and inserts fill codes to the facsimile document when following data packets (datagram) of the facsimile document are unavailable.

Figure 15:
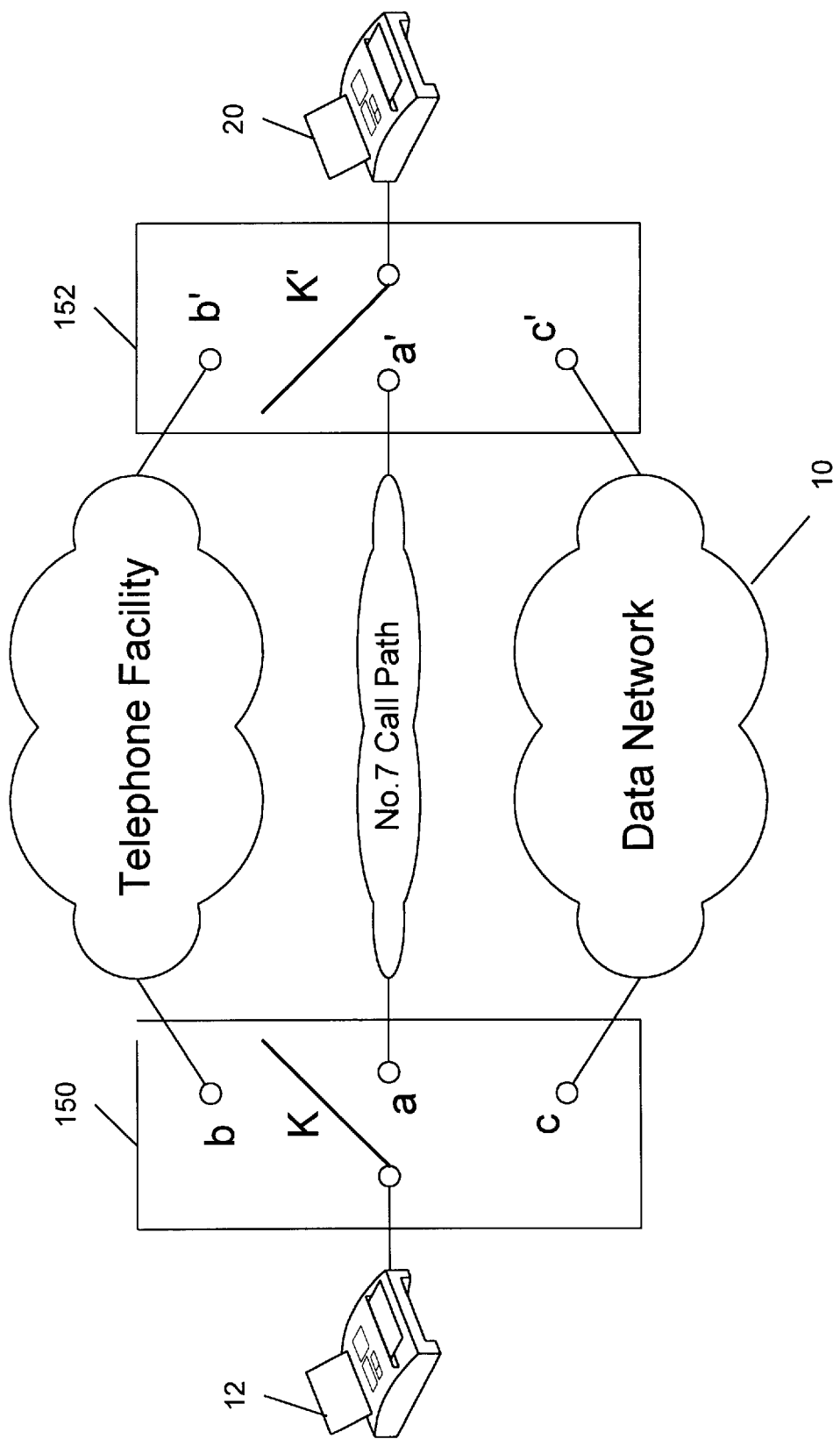

FIG. 15 illustrates various facsimile paths of exemplary facsimile communications using the network 10 of the present invention. For example, when a fax machine 12 such as in the U.S.A. calls a fax machine 20 such as in the Singapore, the user or fax machine 12 normally dials "001-65+local phone number". When a telephone switch 150 in the U.S.A. receives this call, it tries to call the fax machine 20 in Singapore through, for instance, No.7 call path. When fax machine 20 is connected, the telephone switch 150 switches the fax machine 12 to a telephone facility b, and a telephone switch 152 in Singapore switches the fax machine 20 to a telephone facility b'. Then, the fax machine 12 sends the fax document to the fax machine 20 using the telephone facility.

If, for illustration purpose only, we were to allocate a prefix 002 for international fax calling to replace 001, the telephone switch 150 will automatically lead the fax communication into the data network 10. For example, when the fax machine 12 calls the fax machine 20, the fax machine 12 dials "002-65+local phone number", to instruct the data/telephone switch 150 of the type of communication, i.e., that this is a fax (or other type of) communication. When the telephone switch 150 receives this call, it still calls the fax machine 20 in Singapore via the same No.7 call path as before. When the fax machine 20 in Singapore connects, the telephone switch 150 in the U.S.A. switches the fax machine 12 to a data network c, instead of the telephone facility b, and the telephone switch 152 in Singapore switches the fax machine 20 to a data network c', instead of the telephone facility b'. Then, fax machine 12 sends a fax document to fax machine 20 using the data network 10. As a result, it would be very convenient to have the data network 10 send fax documents over long-distances to replace expensive long-distance facsimile communication by telephone network.

Figure 16:
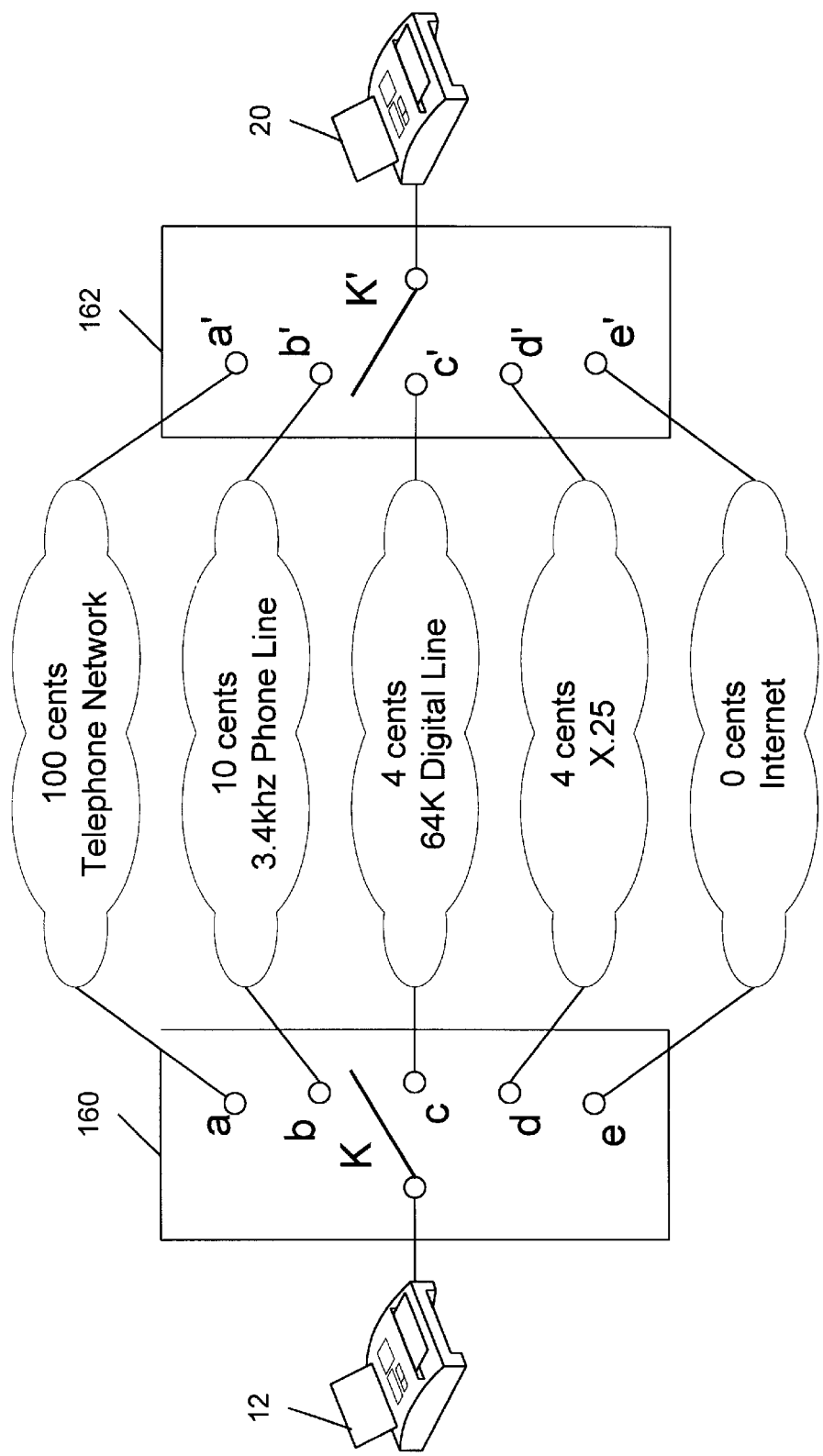

FIG. 16 illustrates yet a different variation of the data communications network 10 of FIG. 15, wherein, various media or paths are (or may be) used to send real-time facsimile. As used in this application, the term "facsimile" is used as an example of the wider term "data", and therefore, the use of the term "facsimile" is not intended to limit the scope of the invention to just facsimile signals, but rather as a representation of various data signals (i.e., digital signals that may include data, audio or video signals).

In general, when a user uses the telephone network to send a fax document, for example, the cost of a one page transmission may be, for example only, 100 cents (or US 1$). The present invention will enable the use of a regular 3.4 kHz phone line, and consequently the phone line can provide more than 10 fax channels (ten fax communications may for instance be transmitted on a single phone line simultaneously). As a result, the per page transmission would be about [100 cents/10=10 cents].

Alternatively, if a 64 k digital line or ISDN line were used, then this line can provide more fax channels, and further reduce the cost of the per page of facsimile transmission cost. Alternatively, if the X0.25 packet-switched network were used to send the data packet, this will also reduce the per page facsimile transmission cost. Yet another alternative for using the present invention is to send the data packets over the Internet at about no cost.

Normally, the transmission of data packets over the Internet is faced with the problem that the data packets are often lost in the Internet, that is, the source node sends a data packet but the destination node does not receive the data packet. Reference is made to Steven W. Richard, 1994, TCP/IP Illustrated, Volume 1, "The Protocols", ISBN 0-201-63346-9 (v.1), which is incorporated herein by reference. The data communications network 10 of the present invention resolves this problem, by using reliable transport protocol, such as, or similar to the Internet TCP protocol. The TCP protocol is as follows: when TCP sends a data packet it maintains a timer, waiting for the other end to acknowledge reception of the data packet. If an acknowledgment is not received on time, the data packet is retransmitted, and therefore data packets are not lost. When using the Internet, if data is lost, the data will have to be resent. However, by using the present invention, the fill codes maintain real-time communication over the Internet.

The present network 10 and nodes of the present invention may be used as data retrieval systems and/or fax on demand systems. Generally, fax-on-demand pauses two general problems. The first problem is that users may not wish to make long-distance calls to retrieve fax documents, to avoid the added expense. The second problem is that companies may not wish to set a lot of fax-on-demand systems worldwide. By using the present data communications network 10 it is now possible for a company to have a single information server, similar to a World Wide Web page or site, so that any person or customer worldwide can access it, interactively, over the Internet and fax machine.

Such a fax-on-demand system may be very useful for commercial advertising to provide details and additional information about a product or service, upon request, i.e., interactively. Facsimile machines may be a very convenient information retrieval device, due to the ready availability of fax machines worldwide.

The present information retrieval network 10, using facsimile machines may have the following features:

1. The network 10 may use the Internet, Intranet or packet-switched networks to connect the information server and the fax server.
2. The information server stores information and can send data packets to fax server.
3. The fax server is connected to local fax machines (fax machines—fax server—Internet—information server).

In operation, a user wishing to retrieve information over the information retrieval network 10 of the present invention, can do so as exemplified by the following situation: In a Singapore's newspaper, a Singaporean reads the following segment of a report: "ASIAN electronics exports will see a further slowdown this year due to global oversupply with Singapore and South Korea hit especially hard, according to a U.S. Salomon Brothers report (222444,0023) yesterday . . . ". Generally, the newspaper does not include the details of the report because most readers may not be interested beyond the headlines. But the detailed report is very important and useful to some business persons in Singapore.

More specifically, let us assume that a Singaporean businessman is interested in the news since he manages a company that produces electronics for export, he urgently likes to have a copy of the detailed Salomon Brothers report. Using his fax machine, he dials a local fax server. After he is connected to the local fax server he dials 2224440023, and then he starts the fax machine to receive the report. At once, the remote fax server sends a facsimile copy of the Salomon Brothers report to his fax machine.

An exemplary method for a user to retrieve information over the Internet is as follows: The user calls a local fax server by phone. Once connected to the fax server, the user inputs the address data (i.e., 222444) of the information server and then dials/accesses the number of the desired report or information (i.e., 0023). After the fax server receives the address data and the access number, it connects to the information server (i.e., in the U.S.A.) and sends the access number to the information server over the Internet. The information server divides information of the access number into data packets and sends the data packets to the fax server. The fax server sends the received data to user's fax machine, and inserts fill codes to the facsimile data stream when following data packets of the information are unavailable.

Figure 18:
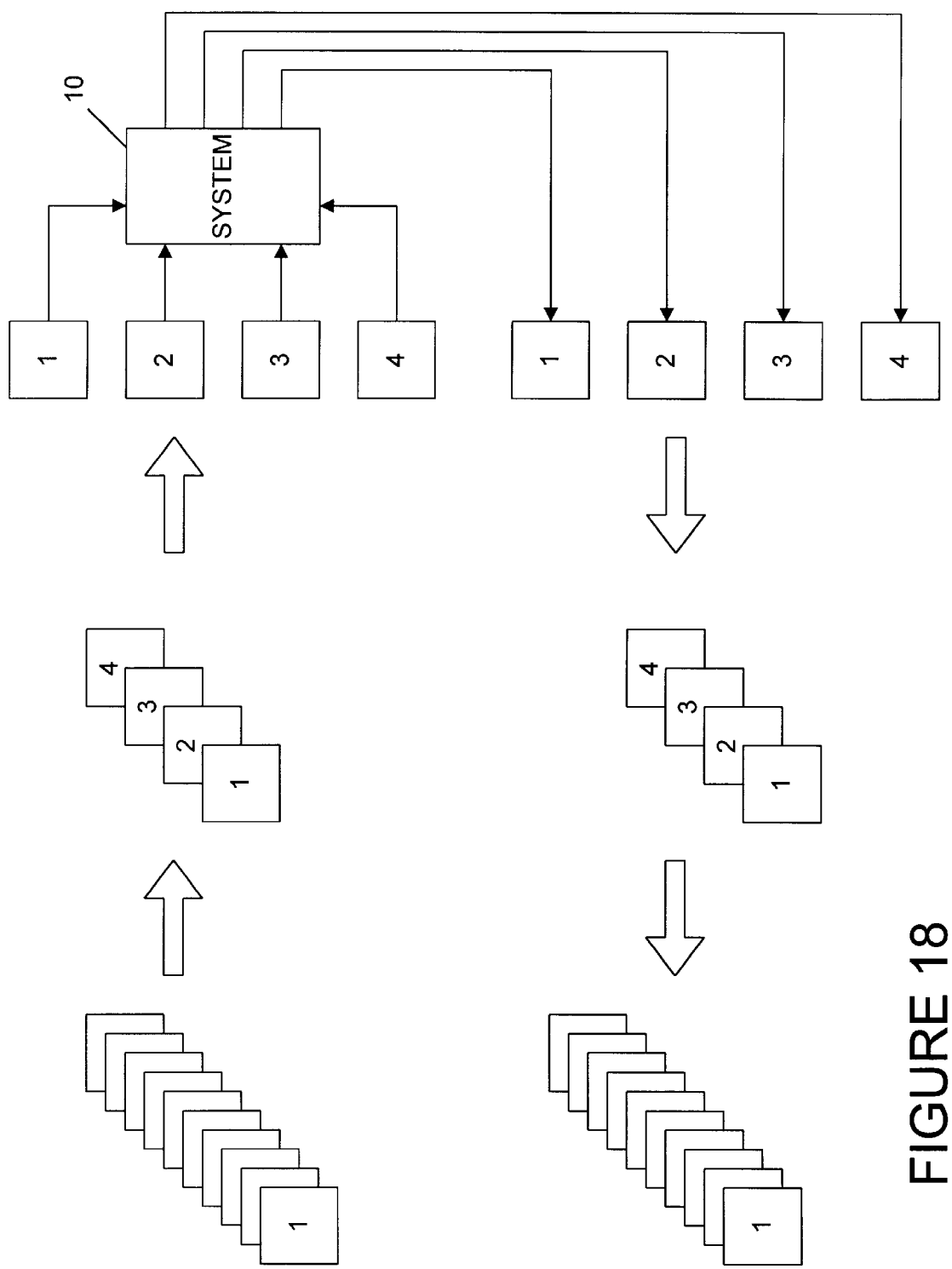

Refer to FIG. 18, another aspect of the present invention describes a source data communication device (SDCD) that sends multiple pages simultaneously. As used herein, multiple pages means several pages or sections of a single page. The SDCD may be a computer that connects to LAN by dial-up modem or network card (such as Ethernet card). The computer generally uses one interface (modem or network card) to connect to LAN. Though the computer can build a lot of logical channels with a remote computer or a lot of remote computers simultaneously, it has one physical channel to the LAN, and its throughput is fixed. For example, the dial-up modem generally has the speed of 14400 bps, and Ethernet has the speed of 10 mbps. When a lot of data packets from one or more applications of a computer are sent over the one physical channel simultaneously, the data packet must queue in the buffer.

For illustration purpose, when a user sends 10 pages to the physical channel (modem) simultaneously, the 10 pages will queue in the buffer of the physical channel. Then the physical channel may send out page 1 first, then send page 2, page 3, . . . , and page 10. In such a case, the computer is said to send these 10 pages serially. The present invention proposes to send the 10 pages in parallel using the methods of the present invention. The source computer or facsimile machine treats each of the 10 pages as a separate document originating from a different data source machine. The single source data machine then simulates or acts as ten virtual sources data machines, i.e., 12, 14, 16, 18, etc. (FIG. 1) each sending the data simultaneously to the source node system 31. In this illustration, the source node system 31 or part of it, may be located at the destination source machine or computer, to assist in the collation and transmission of the signals as taught herein.

Another way for sending multiple pages in parallel is described as follows, with the understanding that the invention is not limited to the specific exemplary embodiments illustrated herein. Many personal computers generally uses Window® Socket as a software driver to connect to the Internet. The Window® Socket can support several logical connections simultaneously, such as 32 connections. For example, a FTP (file transfer protocol, Internet's RFC 959) software uses two TCP connections simultaneously in order to transfer a file, one is control connection for the transfer of the command and reply, and another is data connection for the transfer of the data. So, for example, it is possible to establish 10 TCP connections simultaneously in a personal computer, each connection is responsible for sending a page separately.

In operation, the source data communication machine sends the first page to either a buffer in either the computer or the source node system 31 (which may be, but not necessarily, included or added as part of the source data communication device, i.e., 12), the second page through the ninth page are similarly sent to, and buffered by the source node system 31. Each of these pages is treated as if it were incoming from a different source data communication device with the same destination address (to the same destination data communication device). While it is possible to start sending one or more of these pages separately, as taught herein, it may be preferable to wait until an end of message (EOM) signal be sent from the source data communication device 12 to the node system 31 before the ten pages are simultaneously sent to the destination data communication device, i.e., 20. The EOM signal is sent by the source data communication device 12 after the tenth page is sent to the source node system 31. In the alternative, the source node system 31 can start sending the stored or buffered pages if another signal is issued by either the source data communication device 12 or the source node system 31, such as a signal that the memory is full.

On the destination end, the destination node system, i.e., 35 receives the data for the ten pages, as if it were receiving messages from ten different source data communication devices. The destination node system which may be, but not necessary, in the communication device, i.e., 20, receives and processes these ten pages, and possibly sends then serially, one page at a time to the destination data communication device 20, or in parallel, where a memory stores these pages (particularly if the destination node system 35 is a part of the destination data communication device 20, i.e., not remotely located).

The following are illustrative examples of applications using the teachings of the present examples:

Single Fax Node-Network over Internet

A fax node is set up in New York, U.S.A. and Internet users in the world can send fax documents from their personal computers (PCS) to any fax machines in the U.S.A. at a minimal price. If a user wishes to send a fax document to a toll-free fax number address in New York, he or she can use the fax node at no charge. If a user wishes to send a fax document to other fax machines in New York and in the U.S.A., he/she first obtains an account number and password. For example, the user wishes to send a fax document from Singapore to a fax machine in San Francisco, the telephone charge is about US 1.5$ per minute. When it is desired to send a fax, the user in Singapore inputs a telephone number, then the PC sends a data packet (Internet UDP datagram) to a default fax server which returns a reply to the user's PC. The reply includes an estimated or exact charge (such as US 0.20$ per minute) to send the fax from New York to San Francisco using the service. The user then determines whether or not to send the fax using the proposed service. The reply further includes the destination fax node address (e.g., the New York fax node address) to which the PC will connect and send the fax document. If the user agrees with the charges, he/she inputs his/her password then presses the "OK" button, and the fax transmission begins at once.

Multiple Fax Nodes-Network over Internet.

For example, multiple, (e.g., four) nodes (also referred to as intermediate nodes or intermediate destination nodes) are setup in New York, San Francisco, Europe and Japan separately. If a user wishes to send a fax document from Singapore to a fax machine in Alto Polo, Calif., he/she inputs the destination facsimile number. The user's PC sends a (UDP) data packet to the default fax server in New York, which returns a reply to the PC in Singapore. The 20 cents per minute, from San Francisco to Alto Polo). The user determines whether or not to use the service and incur the estimated charge. The reply further includes the destination fax node address (here San Francisco's Internet fax node address) to which the user's PC will automatically connect and send the fax document. (When the fax server in New York (other servers could additionally be set) is set as a default server, any user in the world who wants to use the fax service first sends a packet to the default fax server, which analyzes the phone number and informs the PC to connect to which fax server. This is for the sole convenience of the user so that the user does not need to remember which server he/she should try to connect. Alternatively, if the user knows the destination node server he/she can connect that destination server directly. The user can send a fax to any place in the word such as U.S.A., Europe, or Japan. Each time the user wishes to send a fax document, he/she will input the destination fax number and his/her password only.) If the user agrees with the service charges and terms, he/she presses the "OK" button, and his/her PC automatically connects to San Francisco's fax node which connects to the ultimate destination fax machine, and the user's PC sends the fax message to the ultimate destination fax machine at once over Internet and San Francisco fax node. Any Internet user can use the intermediate nodes to send fax documents to anywhere else in the world at a reduced charge.

While particular embodiments of the present invention have been disclosed, it is to be understood that various different modifications are possible and are contemplated within the scope of the specification, drawings, abstract and appended claims.

What is claimed is:

1. A node system for use in a communication network including at least one source and at least one destination communication devices, the node system comprising in combination:

an input device for receiving incoming packets device for forming data from said received packets;

device for selectively inserting fill codes into said data so that such selective insertion of said fill codes prevents service interruption between the source and destination communication devices by correcting a temporary inability to receive additional data, and by maintaining real time communication between the source and destination communication devices; and an output device for sending said data and said fill codes to the destination communication device.

2. The node system according to claim 1, wherein the communication network includes a facsimile network including a plurality of destination facsimile machines.

3. The node system according to claim 1, wherein the source communication device sends multiple pages in parallel by sending said multiple pages to the node system; and wherein the node system stores at least some of said multiple pages and treats each of said multiple pages as if it were incoming from a separate source data communication device.

4. The node system according to claim 3, wherein a destination node receives data from the node system as if the data were incoming from multiple source data communication devices.

5. The node system according to claim 1, wherein the source communication device includes a computer.

6. The node system according to claim 1, wherein the destination communication device includes a computer.

7. The node system according to claim 1, wherein said incoming packets represent video signals.

8. The node system according to claim 1, wherein said incoming packets represent audio signals.

9. The node system according to claim 1, wherein said incoming packets represent data signals.

10. The node system according to claim 1, wherein the communication network includes an Internet-type network, an intranet-type network, a wide area-type network, or a local area-type network.

11. A method for retrieving information from an information server, via a fax server, over a communication network, the method comprising:

establishing a connection to the fax server;

inputting an access number of the information;

the fax server establishing a connection to the information server over the communication network;

the information server dividing the information with the access number into data packets, and sending said data packets to the fax server;

the fax server receiving some of said data packets, and converting facsimile data from at least some of said data packets;

the fax server selectively inserting fill codes between said converted facsimile data; and the fax server transmitting said converted facsimile data and fill codes to a fax machine, such that said step of selectively inserting fill codes prevents service interruption over the fax server by correcting a temporary inability to receive additional facsimile data.

12. The method according to claim 11, wherein said step of inputting an access number of the information further includes the step of inputting an address data of the information server to the fax server.

13. A method for sending information from an information server, via a server, over a communication network, comprising:

establishing a connection to the server;

the server establishing a connection to the information server over the communication network;

the information server dividing the information into data packets, and sending at least some of said data packets to the server;

the server receiving said at least some of said data packets, and converting data from at least some of said data packets;

the server selectively inserting fill codes between said converted data; and the server transmitting said converted data and fill codes to a destination device, such that said step of selectively inserting fill codes prevents service interruption over the server by correcting a temporary inability to receive additional data.

14. The method according to claim 13, further including a source device sending multiple pages in parallel by sending said multiple pages to said destination device; and said destination communication device storing at least some of said multiple pages and treating each of said multiple pages as if it were incoming from a separate source data communication device.

15. The method according to claim 14, further including the step of said destination device receiving the data as if the data were incoming from multiple source devices.

16. The method according to claim 15, wherein said destination device includes a destination node, and wherein said step of said destination device receiving the data includes having said destination node receive the data.

17. The method according to claim 13, further including said destination device retrieving the data from any of the information server, the server, or a source device via said communication network.

* * * * *